United States Patent
Zacarias et al.

(10) Patent No.: US 10,414,140 B2
(45) Date of Patent: Sep. 17, 2019

(54) ROOFING COMPOSITIONS COMPRISING PROPYLENE-BASED ELASTOMERS

(71) Applicant: ExxonMobil Chemical Patents Inc., Baytown, TX (US)

(72) Inventors: Felix M. Zacarias, Houston, TX (US); Liang Li, Shanghai (CN); Narayanaswami Dharmarajan, Houston, TX (US); Jan Kalfus, Spring, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 55 days.

(21) Appl. No.: 15/538,790

(22) PCT Filed: Dec. 11, 2015

(86) PCT No.: PCT/US2015/065231
§ 371 (c)(1),
(2) Date: Jun. 22, 2017

(87) PCT Pub. No.: WO2016/137558
PCT Pub. Date: Sep. 1, 2016

(65) Prior Publication Data
US 2017/0368810 A1      Dec. 28, 2017

Related U.S. Application Data

(60) Provisional application No. 62/121,230, filed on Feb. 26, 2015.

(51) Int. Cl.
*B32B 27/32* (2006.01)
*B32B 5/02* (2006.01)
(Continued)

(52) U.S. Cl.
CPC .............. *B32B 27/32* (2013.01); *B32B 5/022* (2013.01); *B32B 5/024* (2013.01); *B32B 7/12* (2013.01); *B32B 27/08* (2013.01); *B32B 27/12* (2013.01); *C08L 23/0815* (2013.01); *C08L 23/12* (2013.01); *C08L 23/14* (2013.01);
(Continued)

(58) Field of Classification Search
CPC ... B32B 27/32; B32B 2419/06; C08L 23/142; C08L 23/14; C08L 23/12; E04C 1/00; E04D 5/06
See application file for complete search history.

(56) References Cited

U.S. PATENT DOCUMENTS

| | | |
|---|---|---|
| 5,723,546 A | 3/1998 | Sustic |
| 6,743,864 B2 | 6/2004 | Glogovsky et al. |

(Continued)

FOREIGN PATENT DOCUMENTS

| | | |
|---|---|---|
| EP | 2072546 | 6/2009 |
| EP | 2660287 | 11/2013 |
| WO | 03/050148 | 6/2003 |
| WO | 2006/023117 | 3/2006 |
| WO | 2010/115079 | 10/2010 |
| WO | 2012/152802 | 11/2012 |

(Continued)

OTHER PUBLICATIONS

Cheung et al., SPE ANTEC, 2004, pp. 2600-2605.

*Primary Examiner* — Catherine S Branch

(57) ABSTRACT

Provided herein are roofing membranes that comprise a blend composition of propylene-based elastomer, thermoplastic resin, flame retardant, and ultraviolet stabilizer. In some embodiments, the blend compositions further comprise polyalphaolefin.

24 Claims, 5 Drawing Sheets

(51) Int. Cl.
  *E04C 1/00* (2006.01)
  *B32B 27/08* (2006.01)
  *B32B 27/12* (2006.01)
  *C08L 23/16* (2006.01)
  *E04D 5/06* (2006.01)
  *B32B 7/12* (2006.01)
  *C08L 23/08* (2006.01)
  *C08L 23/12* (2006.01)
  *C08L 23/14* (2006.01)
  *C08K 3/22* (2006.01)
  *C08K 3/26* (2006.01)

(52) U.S. Cl.
  CPC ............ *C08L 23/142* (2013.01); *C08L 23/16* (2013.01); *E04C 1/00* (2013.01); *E04D 5/06* (2013.01); *B32B 2262/0253* (2013.01); *B32B 2262/0276* (2013.01); *B32B 2262/101* (2013.01); *B32B 2270/00* (2013.01); *B32B 2307/54* (2013.01); *B32B 2419/06* (2013.01); *C08K 2003/2241* (2013.01); *C08K 2003/265* (2013.01); *C08L 2205/025* (2013.01); *C08L 2205/03* (2013.01); *C08L 2205/035* (2013.01); *C08L 2314/06* (2013.01)

(56) References Cited

U.S. PATENT DOCUMENTS

| | | | |
|---|---|---|---|
| 6,750,284 | B1 | 6/2004 | Dharmarajan et al. |
| 6,953,828 | B2 | 10/2005 | Dharmarajan et al. |
| 7,666,491 | B2 | 2/2010 | Yang et al. |
| 7,799,406 | B2 | 9/2010 | Yang et al. |
| 7,927,595 | B1 | 4/2011 | June et al. |
| 8,769,903 | B2 | 7/2014 | Svec |
| 2005/0032959 | A1 | 2/2005 | Cheung et al. |
| 2006/0046084 | A1 | 3/2006 | Yang et al. |
| 2007/0028139 | A1 | 2/2007 | Wahl et al. |
| 2007/0277450 | A1 | 12/2007 | Raulie |
| 2010/0255739 | A1 | 10/2010 | Black et al. |
| 2014/0288228 | A1 | 9/2014 | Mehta et al. |
| 2015/0119515 | A1* | 4/2015 | Frei .............. C08J 5/18 524/437 |
| 2015/0232651 | A1 | 8/2015 | Gossi et al. |

FOREIGN PATENT DOCUMENTS

| | | |
|---|---|---|
| WO | 2014/001224 | 1/2014 |
| WO | 2014/040914 | 3/2014 |
| WO | 2014/105809 | 7/2014 |
| WO | 2015/089359 | 6/2015 |

* cited by examiner

ROOFING COMPOSITIONS COMPRISING PROPYLENE-BASED ELASTOMERS

CROSS REFERENCE TO RELATED APPLICATIONS

This application claims the benefit of priority from U.S. Provisional Application No. 62/121,230, filed Feb. 26, 2015 and PCT/US2015/065231, filed Dec. 11, 2015, which are incorporated by reference in their entirety.

FIELD OF THE INVENTION

Described herein are formulations comprising propylene-based elastomers which are useful in roofing applications, such as thermoplastic roofing applications.

BACKGROUND OF THE INVENTION

Compositions and membranes comprising thermoplastic olefin (TPO) polymers have found widespread use in the roofing industry for commercial buildings. TPO membranes are often fabricated as a composite structure containing a reflective membrane (40 to 60 mils thick), a reinforcing polyester scrim fabric (1 to 2 mils thick), and a pigmented layer (40 to 60 mils thick). When the membrane is applied to the roof, the reflective layer is exposed to sunlight while the pigmented layer (which is underneath the reflective layer) is attached to the roof insulation material.

For roofing and other sheeting applications, the products are typically manufactured as membrane sheets having a typical width of 10 feet (3 meters) or greater, although smaller widths may be available. The sheets are typically sold, transported, and stored in rolls. For roofing membrane applications, several sheets are unrolled at the installation site, placed adjacent to each other with an overlapping edge to cover the roof and are sealed together during installation. During transport the rolls can be exposed to extreme heat conditions, such as from 40° C. to 100° C., which can lead to roll blocking of the rolls during installation. After installation, the membranes can be exposed during service to a wide range of conditions that may deteriorate or destroy the integrity of the membrane. As such, a membrane is desired that can withstand a wide variety of service temperatures, such as from −40° C. to 40° C.

There still remains a need for roofing membranes that demonstrate flexibility at service temperatures from −40° C. to 40° C. and resistance to roll blocking at elevated temperatures.

PCT Publication No. WO 2010/115079A1 is directed to roofing membranes that contain compositions of Formula I that comprises (a) 30 to 50 wt % of a propylene-based elastomer, (b) 9 to 20 wt % of a plastomer, (c) from 7 to 20 wt % of an impact polypropylene-ethylene copolymer, (d) 20 to 35 wt % of magnesium hydroxide, (e) 5 to 10 wt % of titanium dioxide, and (f) 1 to 2 wt % of additives; or compositions of Formula II that comprises (a) 32 to 48 wt % of a propylene-based elastomer, (b) 9 to 18 wt % of a plastomer, (c) 7 to 20 wt % of an impact polypropylene-ethylene copolymer, (d) 25 to 35 wt % of magnesium hydroxide, (e) 4 to 6 wt % of titanium dioxide, (f) 0.75 to 1.5 wt % of UV inhibitor, (g) 0.2 to 0.45 wt % of antioxidant/stabilizer, (h) 0.15 to 0.4 wt % of thermal stabilizer, and (i) 0.1 to 0.2 wt % of lubricant. The propylene-based elastomer used in WO 2010/115079A1 was Vistamaxx™ 6102 and the lubricant used was Asahi AX71 which is a mono or di-stearyl acid phosphate. The roofing membrane in WO 2010/115079A1 is formed around a scrim having reinforcing polyester threads.

PCT Publication No. WO 2014/001224A1 is directed to compositions comprising 40 to 75 wt % of at least one polypropylene-based elastomer and around 25 to 60 wt % of at least one random copolymer of polypropylene. The polypropylene-based elastomers used in WO 2014/001224A1 were Vistamaxx™ 3980, 6102, and 6202.

PCT Publication No. WO 2014/040914A1 is directed to thermoplastic mixtures that comprise at least one impact-resistant polypropylene copolymer and at least one ethylene-1-octene copolymer, where the weight ratio of impact-resistant polypropylene copolymer to ethylene-1-octene copolymer is in the range of 35:65 to 65:35.

Additional background references include U.S. Patent Application Nos. 2006/0046084 and 2007/208139; U.S. Pat. Nos. 6,743,864; 6,953,828; 6,750,284; 7,666,491; 7,799,406; 7,927,595; and 8,769,903; and PCT Publication No. WO 2014/105809.

SUMMARY OF THE INVENTION

Figure 1:
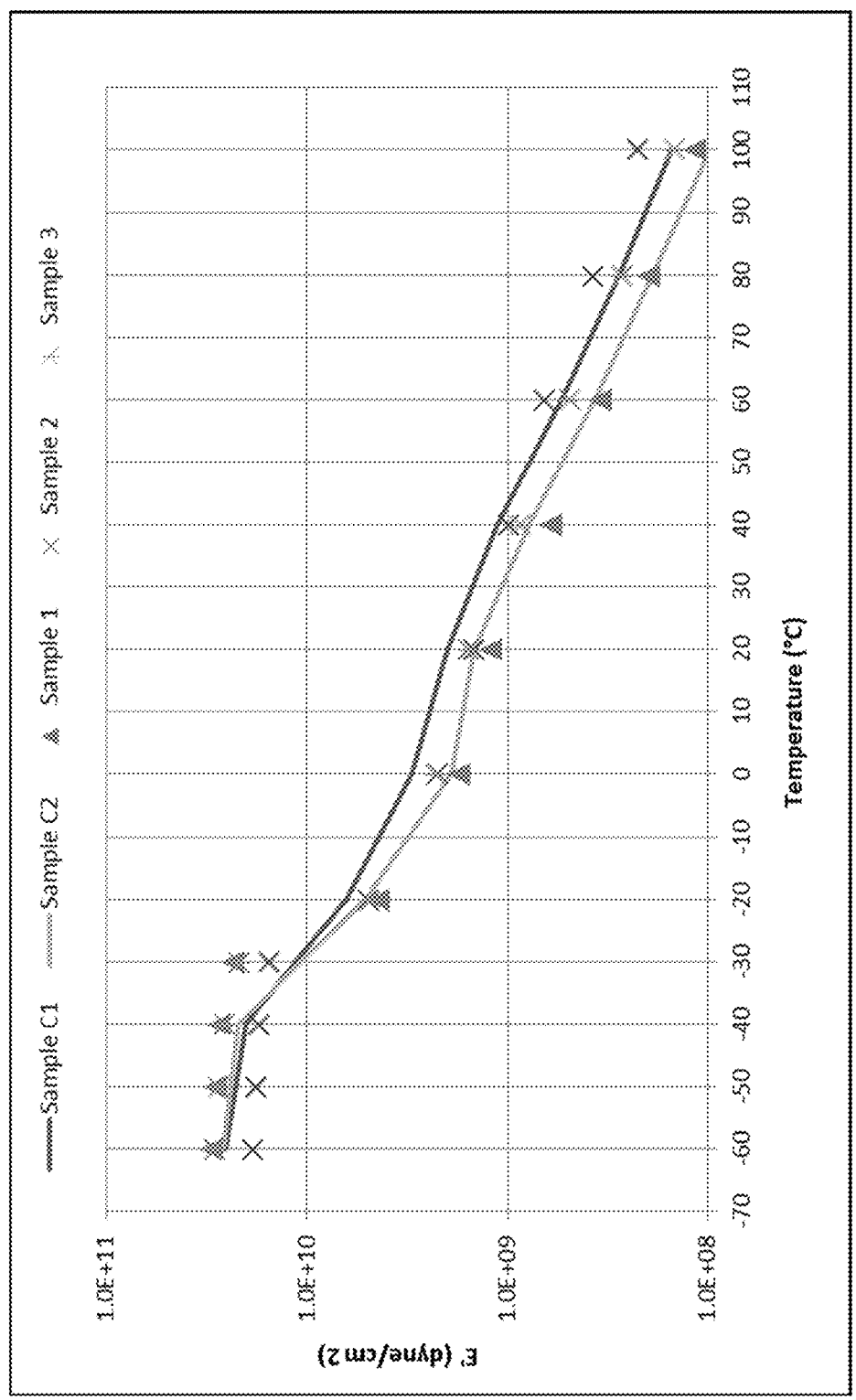
FIG. 1 illustrates the storage modulus (E') of Samples C1, C2, 1, 2, and 3.

Provided herein are roofing membranes that comprise a blend composition of (a) from about 10 wt % to about 50 wt % of a propylene-based elastomer, where the propylene-based polymer elastomer has an ethylene content of from 5 to 30 wt %, based upon the weight of the propylene-based elastomer, wherein the propylene-based elastomer is a reactor blend of a first polymer component and a second polymer component, wherein the first polymer component has an ethylene content $R_1$ of from greater than 5 to less than 30 wt % α-olefin, based upon the total weight of the first polymer component, and wherein the second polymer component has an ethylene content $R_2$ of from greater than 1 to less than 10 wt % α-olefin, based upon the total weight of the second polymer component; (b) from about 5 wt % to about 40 wt % of a thermoplastic resin; (c) at least one flame retardant; and (d) at least one ultraviolet stabilizer.

Also provided herein are roofing membranes that comprise a blend composition of: (a) from about 10 wt % to about 50 wt % of a propylene-based elastomer, where the propylene-based polymer elastomer has an ethylene content of from 16 to 18 wt %, a melting temperature of less than 120° C., and a heat of fusion of less than 75 J/g; (b) from about 1 wt % to about 10 wt % of a polyalphaolefin having a kinematic viscosity (KV) at 100° C. of from 3 to 3000 cSt; (c) from about 5 wt % to about 40 wt % of a thermoplastic resin; (d) at least one flame retardant; and (e) at least one ultraviolet stabilizer.

The blend compositions may have at least three of the following properties:

(i) a storage modulus (E') at −40° C. of less than $2.5 \times 10^{10}$ dynes/cm$^2$;

(ii) a storage modulus (E') at −30° C. of less than $1.5 \times 10^{10}$ dynes/cm$^2$;

(iii) a storage modulus (E') at −20° C. of less than $5 \times 10^9$ dynes/cm$^2$;

(iv) a storage modulus (E') at 0° C. of less than $2 \times 10^9$ dynes/cm$^2$;

(v) a storage modulus (E') at 20° C. of less than $1.5 \times 10^9$ dynes/cm$^2$;

(vi) a storage modulus (E') at 40° C. of greater than $6.5 \times 10^8$ dynes/cm$^2$;

(vii) a storage modulus (E') at 60° C. of greater than $4 \times 10^8$ dynes/cm$^2$;

(viii) a storage modulus (E') at 80° C. of greater than $2 \times 10^8$ dynes/cm$^2$; or (ix) a storage modulus (E') at 100° C. of greater than $1 \times 10^8$ dynes/cm$^2$.

DETAILED DESCRIPTION OF THE INVENTION

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention.

Described herein are compositions comprising propylene-based elastomers that are suitable for roofing applications, particularly roofing membranes. In preferred embodiments, the compositions comprise a propylene-based elastomer that is a reactor-blended polymer as described herein. In preferred embodiments, the compositions further comprise a polyalphaolefin. The compositions provide a balance of properties over a wide range of temperatures. For example, the compositions exhibit flexibility at temperatures from −40° C. to 40° C. and improved properties at elevated temperatures.

All numerical values within the detailed description and the claims herein are modified by "about" or "approximately" the indicated value, and take into account experimental error and variations that would be expected by a person having ordinary skill in the art.

As used herein, the term "copolymer" is meant to include polymers having two or more monomers, optionally, with other monomers, and may refer to interpolymers, terpolymers, etc. The term "polymer" as used herein includes, but is not limited to, homopolymers, copolymers, terpolymers, etc., and alloys and blends thereof. The term "polymer" as used herein also includes impact, block, graft, random, and alternating copolymers. The term "polymer" shall further include all possible geometrical configurations unless otherwise specifically stated. Such configurations may include isotactic, syndiotactic and random symmetries. The term "blend" as used herein refers to a mixture of two or more polymers. The term "elastomer" shall mean any polymer exhibiting some degree of elasticity, where elasticity is the ability of a material that has been deformed by a force (such as by stretching) to return at least partially to its original dimensions once the force has been removed.

The term "monomer" or "comonomer," as used herein, can refer to the monomer used to form the polymer, i.e., the unreacted chemical compound in the form prior to polymerization, and can also refer to the monomer after it has been incorporated into the polymer, also referred to herein as a "[monomer]-derived unit". Different monomers are discussed herein, including propylene monomers, ethylene monomers, and diene monomers.

"Reactor grade," as used herein, means a polymer that has not been chemically or mechanically treated or blended after polymerization in an effort to alter the polymer's average molecular weight, molecular weight distribution, or viscosity. Particularly excluded from those polymers described as reactor grade are those that have been visbroken or otherwise treated or coated with peroxide or other prodegradants. For the purposes of this disclosure, however, reactor grade polymers include those polymers that are reactor blends.

"Reactor blend," as used herein, means a highly dispersed and mechanically inseparable blend of two or more polymers produced in situ as the result of sequential or parallel polymerization of one or more monomers with the formation of one polymer in the presence of another, or by solution blending polymers made separately in parallel reactors. Reactor blends may be produced in a single reactor, a series of reactors, or parallel reactors and are reactor grade blends. Reactor blends may be produced by any polymerization method, including batch, semi-continuous, or continuous systems. Particularly excluded from "reactor blend" polymers are blends of two or more polymers in which the polymers are blended ex situ, such as by physically or mechanically blending in a mixer, extruder, or other similar device.

Propylene-Based Elastomer

The compositions described herein comprise one or more propylene-based elastomers ("PBEs"). The PBE comprises propylene and from about 5 to about 30 wt % of one or more comonomers selected from ethylene and/or $C_4$-$C_{12}$ α-olefins, and, optionally, one or more dienes. For example, the comonomer units may be derived from ethylene, butene, pentene, hexene, 4-methyl-1-pentene, octene, or decene. In preferred embodiments the comonomer is ethylene. In some embodiments, the propylene-based elastomer composition consists essentially of propylene and ethylene derived units, or consists only of propylene and ethylene derived units. Some of the embodiments described below are discussed with reference to ethylene as the comonomer, but the embodiments are equally applicable to other copolymers with other α-olefin comonomers. In this regard, the copolymers may simply be referred to as PBEs with reference to ethylene as the α-olefin.

The PBE may include at least about 5 wt %, at least about 7 wt %, at least about 9 wt %, at least about 10 wt %, at least about 12 wt %, at least about 13 wt %, at least about 14 wt %, at least about 15 wt %, or at least about 16 wt %, α-olefin-derived units, based upon the total weight of the PBE. The PBE may include up to about 30 wt %, up to about 25 wt %, up to about 22 wt %, up to about 20 wt %, up to about 19 wt %, up to about 18 wt %, or up to about 17 wt %, α-olefin-derived units, based upon the total weight of the PBE. In some embodiments, the PBE may comprise from about 5 to about 30 wt %, from about 6 to about 25 wt %, from about 7 wt % to about 20 wt %, from about 10 to about 19 wt %, from about 12 wt % to about 19 wt %, or from about 15 wt % to about 18 wt %, or form about 16 wt % to about 18 wt %, α-olefin-derived units, based upon the total weight of the PBE.

The PBE may include at least about 70 wt %, at least about 75 wt %, at least about 78 wt %, at least about 80 wt %, at least about 81 wt %, at least about 82 wt %, or at least 83 wt %, propylene-derived units, based upon the total weight of the PBE. The PBE may include up to about 95 wt %, up to about 93 wt %, up to about 91 wt %, up to about 90 wt %, up to about 88 wt %, or up to about 87 wt %, or up to about 86 wt %, or up to about 85 wt %, or up to about 84 wt %, propylene-derived units, based upon the total weight of the PBE.

The PBEs of can be characterized by a melting point (Tm), which can be determined by differential scanning calorimetry (DSC). Using the DSC test method described herein, the melting point is the temperature recorded corresponding to the greatest heat absorption within the range of melting temperature of the sample. When a single melting peak is observed, that peak is deemed to be the "melting point." When multiple peaks are observed (e.g., principle and secondary peaks), then the melting point is deemed to be the highest of those peaks. It is noted that due to the low-crystallinity of many PBEs, the melting point peak may be at a low temperature and be relatively flat, making it difficult to determine the precise peak location. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

The Tm of the PBE (as determined by DSC) may be less than about 120° C., less than about 115° C., less than about 110° C., less than about 105° C., less than about 100° C., less than about 90° C., less than about 80° C., less than about 70° C., less than about 65° C., or less than about 60° C. In some embodiments, the PBE may have a Tm of from about 20 to about 110° C., from about 30 to about 110° C., from about 40 to about 110° C., or from about 50 to about 105° C., where desirable ranges may include ranges from any lower limit to any upper limit. In some embodiments, the PBE may have a Tm of from about 40 to about 70° C., or from about 45 to about 65° C., or from about 50 to about 60° C., where desirable ranges may include ranges from any lower limit to any upper limit. In some embodiments, the PBE may have a Tm of from about 80 to about 110° C., or from about 85 to about 110° C., or from about 90 to about 105° C., where desirable ranges may include ranges from any lower limit to any upper limit.

The PBE can be characterized by its heat of fusion (Hf, as determined by DSC. The PBE may have an Hf that is at least about 0.5 J/g, at least about 1.0 J/g, at least about 1.5 J/g, at least about 3.0 J/g, at least about 5.0 J/g, at least about 7.0 J/g, at least about 10.0 J/g, or at least about 12 J/g. The PBE may be characterized by an Hf of less than about 75 J/g, less than about 65 J/g, at less than about 60 J/g, less than about 55 J/g, less than about 50 J/g, less than about 40 J/g, less than about 35 J/g, less than about 30 J/g, less than about 25 J/g, less than about 20 J/g, less than about 17 J/g, or less than 15 J/g. In some embodiments, the PBE may have a Hf of from about 1.0 to about 40 J/g, from about 3.0 to about 30 J/g, or from about 5.0 to about 20 J/g, where desirable ranges may include ranges from any lower limit to any upper limit. In some embodiments, the PBE may have a Hf of from about 1.0 to about 15 J/g or from about 3.0 to about 10 J/g, where desirable ranges may include ranges from any lower limit to any upper limit. In some embodiments, the PBE may have a Hf of from 5.0 to about 30 J/g, from about 7.0 to about 25 J/g, or from about 12 to about 20 J/g, where desirable ranges may include ranges from any lower limit to any upper limit.

As used herein, DSC procedures for determining Tm and Hf are as follows. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a DSC (Perkin Elmer Pyris One Thermal Analysis System) and cooled to about −30° C. to about −50° C. and held for 10 minutes at that temperature. The sample is then heated at 10° C./min to attain a final temperature of about 200° C. The sample is kept at 200° C. for 5 minutes. Then a second cool-heat cycle is performed, where the sample is cooled to about −30° C. to about −50° C. and held for 10 minutes at that temperature, and then re-heated at 10° C./min to a final temperature of about 200° C. Events from both cycles are recorded. The thermal output is recorded as the area under the melting peak of the sample, which typically occurs between about 0° C. and about 200° C. It is measured in Joules and is a measure of the Hf of the polymer.

Preferably, the PBE has crystalline regions interrupted by non-crystalline regions. The non-crystalline regions can result from regions of non-crystallizable propylene segments, the inclusion of comonomer units, or both. In one or more embodiments, the PBE has a propylene-derived crystallinity that is isotactic, syndiotactic, or a combination thereof. In a preferred embodiment, the PBE has isotactic sequences. The presence of isotactic sequences can be determined by NMR measurements showing two or more propylene derived units arranged isotactically. Such isotactic sequences can, in some cases be interrupted by propylene units that are not isotactically arranged or by other monomers that otherwise disturb the crystallinity derived from the isotactic sequences.

The PBE can have a triad tacticity of three propylene units (mmm tacticity), as measured by 13C NMR, of 75% or greater, 80% or greater, 85% or greater, 90% or greater, 92% or greater, 95% or greater, or 97% or greater. In one or more embodiments, the triad tacticity may range from about 75 to about 99%, from about 80 to about 99%, from about 85 to about 99%, from about 90 to about 99%, from about 90 to about 97%, or from about 80 to about 97%. Triad tacticity is determined by the methods described in U.S. Pat. No. 7,232,871.

The PBE may have a tacticity index m/r ranging from a lower limit of 4 or 6 to an upper limit of 8 or 10 or 12. The tacticity index, expressed herein as "m/r", is determined by $^{13}C$ nuclear magnetic resonance ("NMR"). The tacticity index, m/r, is calculated as defined by H. N. Cheng in Vol. 17, MACROMOLECULES, pp. 1950-1955 (1984), incorporated herein by reference. The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 describes an atactic material. An isotactic material theoretically may have a ratio approaching infinity, and many by-product atactic polymers have sufficient isotactic content to result in ratios of greater than 50.

The PBE may have a percent crystallinity of from about 0.5% to about 40%, from about 1% to about 30%, or from about 5% to about 25%, determined according to DSC procedures, where desirable ranges may include ranges from any lower limit to any upper limit. Crystallinity may be determined by dividing the Hf of a sample by the Hf of a 100% crystalline polymer, which is assumed to be 189 J/g for isotactic polypropylene.

The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm-1 to 4000 cm-1 is recorded and the monomer weight percent of ethylene can be calculated according to the following equation: Ethylene wt %=82.585−111.987X+30.045X2, where X is the ratio of the peak height at 1155 cm-1 and peak height at either 722 cm-1 or 732 cm-1, whichever is higher. For propylene ethylene copolymers having 75 wt % or less propylene content, the comonomer (ethylene) content can be measured using the procedure described in Wheeler and Willis. Reference is made to U.S. Pat. No. 6,525,157 which contains more details on GPC measurements, the determination of ethylene content by NMR and the DSC measurements.

The PBE may have a density of from about 0.84 g/cm³ to about 0.92 g/cm³, from about 0.85 g/cm³ to about 0.90 g/cm³, or from about 0.85 g/cm³ to about 0.87 g/cm³ at room temperature, as measured per the ASTM D-1505 test method, where desirable ranges may include ranges from any lower limit to any upper limit.

The PBE can have a melt index (MI) (ASTM D-1238, 2.16 kg @ 190° C.), of less than or equal to about 10 g/10 min, less than or equal to about 8.0 g/10 min, less than or equal to about 5.0 g/10 min, or less than or equal to about 3.0 g/10 min, or less than or equal to about 2.0 g/10 min. In some embodiments, the PBE may have a MI of from about 0.5 to about 3.0 g/10 min, or from 0.75 to about 2.0 g/10 min, where desirable ranges may include ranges from any lower limit to any upper limit.

The PBE may have a melt flow rate (MFR), as measured according to ASTM D-1238 (2.16 kg weight @ 230° C.), greater than about 0.5 g/10 min, greater than about 1.0 g/10 min, greater than about 1.5 g/10 min, greater than about 2.0 g/10 min, or greater than about 2.5 g/10 min. The PBE may have an MFR less than about 25 g/10 min, less than about 15 g/10 min, less than about 10 g/10 min, less than about 7 g/10 min, or less than about 5 g/10 min. In some embodiments, the PBE may have an MFR from about 0.5 to about 10 g/10 min, from about 1.0 to about 7 g/10 min, or from about 1.5 to about 5 g/10 min, where desirable ranges may include ranges from any lower limit to any upper limit.

The PBE may have a g' index value of 0.95 or greater, or at least 0.97, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the polymer and $\eta_l$ is the intrinsic viscosity of a linear polymer of the same viscosity-averaged molecular weight (Mv) as the polymer. $\eta_l = KMv^\alpha$, K and α are measured values for linear polymers and should be obtained on the same instrument as the one used for the g' index measurement.

The PBE may have a weight average molecular weight (Mw), as measured by MALLS, of from about 100,000 to about 500,000 g/mol, from about 125,000 to about 400,000 g/mol, from about 150,000 to about 350,000 g/mol, from about 200,000 to about 300,000 g/mol, or from about 210,000 to about 250,000 g/mol, where desirable ranges may include ranges from any lower limit to any upper limit. In some embodiments, the PBE may have a Mw of from about 175,000 to about 260,000 g/mol, from about 190,000 to about 250,000 g/mol, from about 200,000 to about 250,000 g/mol, or from about 210,000 to about 240,000 g/mol where desirable ranges may include ranges from any lower limit to any upper limit.

The PBE may have a number average molecular weight (Mn), as measured by DRI, of from about 50,000 to about 500,000 g/mol, from about 60,000 to about 300,000 g/mol, from about 80,000 to about 250,000 g/mol, from about 90,000 to about 200,000 g/mol, or from about 100,000 to about 150,000 g/mol, where desirable ranges may include ranges from any lower limit to any upper limit. In some embodiments, the PBE may have a Mn of from about 90,000 to about 130,000 g/mol, from about 95,000 to about 125,000 g/mol, or from about 100,000 to about 120,000 g/mol, where desirable ranges may include ranges from any lower limit to any upper limit.

The PBE may have a Z-average molecular weight (Mz), as measured by MALLS, of from about 50,000 to about 1,000,000 g/mol, or from about 75,000 to about 500,000 g/mol, or from about 100,000 to about 400,000 g/mol, from about 200,000 to about 375,000 g/mol, or from about 300,000 to about 360,000 g/mol, where desirable ranges may include ranges from any lower limit to any upper limit.

The molecular weight distribution (MWD, equal to Mw/Mn) of the PBE may be from about 0.5 to about 10, from about 0.75 to about 5, from about 1.0 to about 5, from about 1.5 to about 4, or from about 1.8 to about 3, where desirable ranges may include ranges from any lower limit to any upper limit.

The PBE may have a Shore D hardness (ASTM D2240) of less than about less than about 50, less than about 45, less than about 40, less than about 35, or less than about 20.

The PBE may have a Shore A hardness (ASTM D2240) of less than about less than about 100, less than about 95, less than about 90, less than about 85, less than about 80, less than about 75, or less than 70. In some embodiments, the PBE may have a Shore A hardness of from about 10 to about 100, from about 15 to about 90, from about 20 to about 80, or from about 30 to about 70, where desirable ranges may include ranges from any lower limit to any upper limit.

In some embodiments, the PBE is a propylene-ethylene copolymer that has at least four, or at least five, or at least six, or at least seven, or at least eight, or all nine of the following properties (i) from about 10 to about 25 wt %, or from about 12 to about 20 wt %, or from about 16 wt % to about 17 wt % ethylene-derived units, based on the weight of the PBE; (ii) a Tm of from 80 to about 110° C., or from about 85 to about 110° C., or from about 90 to about 105° C.; (iii) a Hf of less than about 75 J/g, or less than 50 J/g, or less than 30 J/g, or from about 1.0 to about 15 J/g or from about 3.0 to about 10 J/g; (iv) a MI of from about 0.5 to about 3.0 g/10 min or from about 0.75 to about 2.0 g/10 min; (v) a MFR of from about 0.5 to about 10 g/10 min, or from 0.75 to about 8 g/10 min, or from about 0.75 to about 5 g/10 min; (vi) a Mw of from about 175,000 to about 260,000 g/mol, or from about 190,000 to about 250,000 g/mol, or from about 200,000 to about 250,000 g/mol, or from about 210,000 to about 240,000 g/mol; (vii) a Mn of from about 90,000 to about 130,000 g/mol, or from about 95,000 to about 125,000 g/mol, or from about 100,000 to about 120,000 g/mol; (viii) a MWD of from about 1.0 to about 5, or from about 1.5 to about 4, or from about 1.8 to about 3; and/or (ix) a Shore D hardness of less than 30, or less than 25, or less than 20. In some embodiments, such a PBE is a reactor-blended PBE as described herein.

Optionally, the PBE may also include one or more dienes. The term "diene" is defined as a hydrocarbon compound that has two unsaturation sites, i.e., a compound having two double bonds connecting carbon atoms. Depending on the context, the term "diene" as used herein refers broadly to either a diene monomer prior to polymerization, e.g., forming part of the polymerization medium, or a diene monomer after polymerization has begun (also referred to as a diene monomer unit or a diene-derived unit). In some embodiments, the diene may be selected from 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD), and combinations thereof. In embodiments where the propylene-based polymer comprises a diene, the diene may be present at from 0.05 wt % to about 6 wt %, from about 0.1 wt % to about 5.0 wt %, from about 0.25 wt % to about 3.0 wt %, or from about 0.5 wt % to about 1.5 wt %, diene-derived units, based upon the total weight of the PBE.

Optionally, the PBE may be grafted (i.e., "functionalized") using one or more grafting monomers. As used herein, the term "grafting" denotes covalent bonding of the grafting monomer to a polymer chain of the propylene-based polymer. The grafting monomer can be or include at least one ethylenically unsaturated carboxylic acid or acid derivative, such as an acid anhydride, ester, salt, amide, imide, acrylates or the like. Illustrative grafting monomers include, but are not limited to, acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo(2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer. In embodiments wherein the graft monomer is maleic anhydride, the maleic anhydride concentration in the grafted polymer is preferably in the range of about 1 wt % to about 6 wt %, at least about 0.5 wt %, or at least about 1.5 wt %.

In preferred embodiments, the PBE is a reactor grade or reactor blended polymer, as defined above. That is, in preferred embodiments, the PBE is a reactor blend of a first polymer component and a second polymer component. Thus, the comonomer content of the PBE can be adjusted by adjusting the comonomer content of the first polymer component, adjusting the comonomer content of second polymer component, and/or adjusting the ratio of the first polymer component to the second polymer component present in the PBE.

In embodiments where the PBE is a reactor blended polymer, the α-olefin content of the first polymer component ("R$_1$") may be greater than 5 wt %, greater than 7 wt %, greater than 10 wt %, greater than 12 wt %, greater than 15 wt %, or greater than 17 wt %, based upon the total weight of the first polymer component. The α-olefin content of the first polymer component may be less than 30 wt %, less than 27 wt %, less than 25 wt %, less than 22 wt %, less than 20 wt %, or less than 19 wt %, based upon the total weight of the first polymer component. In some embodiments, the α-olefin content of the first polymer component may range from 5 wt % to 30 wt %, from 7 wt % to 27 wt %, from 10 wt % to 25 wt %, from 12 wt % to 22 wt %, from 15 wt % to 20 wt %, or from 17 wt % to 19 wt %. Preferably, the first polymer component comprises propylene and ethylene derived units, or consists essentially of propylene and ethylene derived units.

In embodiments where the PBE is a reactor blended polymer, the α-olefin content of the second polymer component ("R$_2$") may be greater than 1.0 wt %, greater than 1.5 wt %, greater than 2.0 wt %, greater than 2.5 wt %, greater than 2.75 wt %, or greater than 3.0 wt % α-olefin, based upon the total weight of the second polymer component. The α-olefin content of the second polymer component may be less than 10 wt %, less than 9 wt %, less than 8 wt %, less than 7 wt %, less than 6 wt %, or less than 5 wt %, based upon the total weight of the second polymer component. In some embodiments, the α-olefin content of the second polymer component may range from 1.0 wt % to 10 wt %, or from 1.5 wt % to 9 wt %, or from 2.0 wt % to 8 wt %, or from 2.5 wt % to 7 wt %, or from 2.75 wt % to 6 wt %, or from 3 wt % to 5 wt %. Preferably, the second polymer component comprises propylene and ethylene derived units, or consists essentially of propylene and ethylene derived units.

In embodiments where the PBE is a reactor blended polymer, the PBE may comprise from 1 to 25 wt % of the second polymer component, from 3 to 20 wt % of the second polymer component, from 5 to 18 wt % of the second polymer component, from 7 to 15 wt % of the second polymer component, or from 8 to 12 wt % of the second polymer component, based on the weight of the PBE, where desirable ranges may include ranges from any lower limit to any upper limit. The PBE may comprise from 75 to 99 wt % of the first polymer component, from 80 to 97 wt % of the first polymer component, from 85 to 93 wt % of the first polymer component, or from 82 to 92 wt % of the first polymer component, based on the weight of the PBE, where desirable ranges may include ranges from any lower limit to any upper limit.

The PBE are preferably prepared using homogeneous conditions, such as a continuous solution polymerization process. In some embodiments, the PBE are prepared in parallel solution polymerization reactors, such that the first reactor component is prepared in a first reactor and the second reactor component is prepared in a second reactor, and the reactor effluent from the first and second reactors are combined and blended to form a single reactor effluent from which the final PBE is separated. Exemplary methods for the preparation of PBEs may be found in U.S. Pat. Nos. 6,881, 800; 7,803,876; 8,013,069; and 8,026,323 and PCT Publications WO 2011/087729; WO 2011/087730; and WO 2011/087731.

Polyalphaolefin

In general polyalphaolefins (PAOs) are oligomers of α-olefins (also known as 1-olefins) and are often used as the base stock for synthetic lubricants. PAOs are typically produced by the polymerization of α-olefins, preferably linear α-olefins. A PAO may be characterized by any type of tacticity, including isotactic or syndiotactic and/or atactic, and by any degree of tacticity, including isotactic-rich or syndiotactic-rich or fully atactic. PAO liquids are described in, for example, U.S. Pat. Nos. 3,149,178; 4,827,064; 4,827,073; 5,171,908; and 5,783,531; and in SYNTHETIC LUBRICANTS AND HIGH-PERFORMANCE FUNCTIONAL FLUIDS, Leslie R. Rudnick & Ronald L. Shubkin, eds. (Marcel Dekker, 1999), pp. 3-52. PAOs are Group 4 compounds, as defined by the American Petroleum Institute (API).

Useful PAOs may be made by any suitable means known in the art. For example, the PAOs may be prepared by the oligomerization of an α-olefin in the presence of a polymerization catalyst, such as a Friedel-Crafts catalyst (including, for example, $AlCl_3$, $BF_3$, and complexes of $BF_3$ with water, alcohols, carboxylic acids, or esters), a coordination complex catalyst (including, for example, the ethylaluminum sesquichloride+$TiCl_4$ system), or a homogeneous or heterogeneous (supported) catalyst more commonly used to make polyethylene and/or polypropylene (including, for example, Ziegler-Natta catalysts, metallocene or other single-site catalysts, and chromium catalysts). Subsequent to the polymerization, the PAO may be hydrogenated in order to reduce any residual unsaturation. PAO's may be hydrogenated to yield substantially (>99 wt. %) paraffinic materials. The PAO's may also be functionalized to comprise, for example, esters, polyethers, polyalkylene glycols, and the like.

The percentage of carbons in chain-type paraffinic structures ($C_P$) is close to 100% (typically greater than 98% or even 99%) for PAOs.

In general, PAOs are high purity hydrocarbons with a paraffinic structure and a high-degree of side-chain branching. The PAO may have irregular branching or regular branching. The PAO may comprise oligomers or low molecular weight polymers of branched and/or linear alpha olefins. In some embodiments, the PAO comprises $C_6$ to $C_{2000}$, or $C_8$ to $C_{1500}$, or $C_{10}$ to $C_{1000}$, or $C_{15}$ to $C_{800}$, or $C_{20}$ to $C_{400}$, or $C_{30}$ to $C_{250}$ oligomers of α-olefins. These oligomers may be dimers, trimers, tetramers, pentamers, etc. In some embodiments, the PAO comprises $C_2$ to $C_{24}$, preferably $C_5$ to $C_{18}$, more preferably $C_6$ to $C_{14}$, even more preferably $C_8$ to $C_{12}$, most preferably $C_{10}$ branched or linear α-olefins. In some embodiments, the PAO comprises $C_3$ to $C_{24}$, preferably $C_5$ to $C_8$, more preferably $C_6$ to $C_{14}$, most preferably $C_8$ to $C_{12}$ linear α-olefins (LAOs). Suitable olefins include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, and blends thereof. Oligomers of LAOs with only even carbon numbers between 6 and 18 (inclusive) are particularly preferred. Preferably $C_2$, $C_3$, and $C_4$ α-olefins (i.e., ethylene, propylene and 1-butene and/or isobutylene) are present in the PAO oligomers at an average concentration of 30 wt % or less, or 20 wt % or less, or 10 wt % or less, or 5 wt % or less; more preferably $C_2$, $C_3$, and $C_4$ α-olefins are not present in the PAO oligomers. Useful PAOs are described more particularly in, for example, U.S. Pat. Nos. 5,171,908 and 5,783,531, both of which are herein incorporated by reference.

In some embodiments, a single LAO is used to prepare the oligomers. For example, the PAO may be formed by the oligomerization of 1-decene, and the PAO is a mixture of oligomers (including, for example, dimers, trimers, tetramers, pentamers, and higher) of 1-decene.

In some embodiments, the PAO may comprise a blend of oligomers of two or more $C_3$ to $C_{18}$ LAOs (preferably $C_5$ to $C_{18}$ LAOs), to make 'bipolymer' or 'terpolymer' or higher-order copolymer combinations, provided that $C_3$ and $C_4$ LAOs are present at 10 wt % or less. For example, a preferred embodiment involves the oligomerization of a mixture of 1-octene, 1-decene, and 1-dodecene, and the PAO is a mixture of oligomers (for example, dimers, trimers, tetramers, pentamers, and higher) of 1-octene/1-decene/1-dodecene 'terpolymer'.

In some embodiments, the PAO comprises oligomers of a single α-olefin species having a carbon number of 5 to 24 (preferably 6 to 18, preferably 8 to 12, most preferably 10). In some embodiments, the PAO comprises oligomers of mixed α-olefins (i.e., involving two or more α-olefin species), each α-olefin having a carbon number of 3 to 24 (preferably 5 to 24, preferably 6 to 18, most preferably 8 to 12), provided that α-olefins having a carbon number of 3 or 4 are present at 10 wt % or less. In a particularly preferred embodiment, the PAO comprises oligomers of mixed α-olefins (i.e., involving two or more α-olefin species) where the weighted average carbon number for the α-olefin mixture is 6 to 14 (preferably 8 to 12, preferably 9 to 11).

In another embodiment, the PAO comprises oligomers of one or more α-olefin with repeat unit formulas of:

—[CHR—$CH_2$]— where R is a $C_3$ to $C_{18}$ saturated hydrocarbon branch. Preferably R is constant for all oligomers. In another embodiment, there is a range of R substituents covering carbon numbers from 3 to 18. Preferably R is linear, i.e., R is $(CH_2)_z CH_3$, where z is 2 to 17 (preferably 3 to 11, preferably 4 to 9).

Optionally, R may contain one methyl or ethyl branch, i.e.,

R is $(CH_2)_m[CH(CH_3)](CH_2)_n CH_3$ or $(CH_2)_x[CH(CH_2CH_3)](CH_2)_y CH_3$, where (m+n) is 1 to 15 (preferably 1 to 9, preferably 3 to 7) and (x+y) is 1 to 14 (preferably 1 to 8, preferably 2 to 6). Preferably m>n. Preferably m is 0 to 15 (preferably 2 to 15, preferably 3 to 12, preferably 4 to 9) and n is 0 to 10 (preferably 1 to 8, preferably 1 to 6, preferably 1 to 4). Preferably x>y. Preferably x is 0 to 14 (preferably 1 to 14, preferably 2 to 11, preferably 3 to 8) and y is 0 to 10 (preferably 1 to 8, preferably 1 to 6, preferably 1 to 4). Preferably the repeat units are arranged in a head-to-tail fashion with minimal heat-to-head connections.

The PAO may be atactic, isotactic, or syndiotactic. In one embodiment, the PAO has essentially the same population of meso [m] and racemic [r] dyads (preferably neither [m] nor [r] greater than 60%, preferably neither greater than 55%) as measured by $^{13}$C-NMR, making it atactic. In another embodiment, the PAO has more than 60% (preferably more than 70%, preferably more than 80%, preferably more than 90%) meso dyads [m]. In another embodiment, the PAO has more than 60% (preferably more than 70%, preferably more than 80%, preferably more than 90%) racemic dyads [r]. In one embodiment, [m]/[r] determined by $^{13}$C-NMR is between 0.9 and 1.1 in one embodiment, [m]/[r] is greater than 1 in another embodiment, and [m]/[r] is less than 1 in yet another embodiment.

Preferred PAOs have a "branching ratio" as defined in U.S. Pat. No. 4,827,064 and measured according to the method described therein, of 0.20 or less, preferably 0.19 or less, preferably 0.18 or less, preferably 0.17 or less, preferably 0.15 or less, preferably 0.12 or less, preferably 0.10 or less.

The PAO may have a number average molecular weight ($M_n$) in the range of $1.00 \times 10^2$ to $2.10 \times 10^4$ g/mol or $3.00 \times 10^2$ to $1.50 \times 10^4$ g/mol, or in the range of $2.00 \times 10^2$ to $1.00 \times 10^4$, or $2.00 \times 10^2$ to $7.00 \times 10^3$, or $6.00 \times 10^2$ to $3.00 \times 10^3$, or $2.00 \times 10^2$ to $2.00 \times 10^3$, or $2.00 \times 10^2$-$5.00 \times 10^2$ g/mol.

The PAOs may have a weight average molecular weight ($M_w$) of less than 10,000 g/mol, or less than 5,000 g/mol, or less than 4,000 g/mol, or less than 2,000 g/mol, or less than 1,000 g/mol. In some embodiments, the PAO may have an $M_w$ of 250 g/mol or more, 400 g/mol or more, or 500 g/mol or more, or 600 g/mol or more, or 700 g/mol or more, or 750 g/mol or more. In some embodiments, the PAO may have a Mw in the range of from 250 to 10,000 g/mol, or from 400 to 5,000 g/mol, or form 500 to 4,000 g/mol, or from 600 to 2000 g/mol, or from 700 to 1000 g/mol.

Useful PAOs have a kinematic viscosity ("KV") at 100° C., as measured by ASTM D445 at 100° C., of 3 cSt (1 cSt=1 mm$^2$/s) to 3,000 cSt, 4 to 1,000 cSt, 6 to 300 cSt, 8 to 125 cSt, 8 to 100 cSt, or 10 to 60 cSt. In some embodiments, the PAO has a KV at 100° C. of 5 to 1000 cSt, preferably 6 to 300 cSt, preferably 7 to 100 cSt, or 8 to 50 cSt.

Useful PAOs have a kinematic viscosity ("KV") as measured by ASTM D445 at 40° C. of 5.0 to about 500 cSt, about 10 to 300 cSt, or 20 to 200 cSt, or 30 to 100 cSt, or 40 to 80 cSt, or 50 to 75 cSt.

The PAOs may also have a viscosity index ("VI"), as determined by ASTM D2270, of 50 to 400, or 60 to 350, or 70 to 250, or 80 to 200, or preferably 90 to 175, or 100 to 150.

The PAO may have a pour point, as determined by ASTM D5950/D97, of −100° C. to 0° C., −100° C. to −10° C., −90° C. to −15° C., −80° C. to −20° C. In some embodiments, the PAO or blend of PAOs has a pour point of −25 to −75° C., preferably −40 to −60° C.

The PAO may have a flash point, as determined by ASTM D92, of 150° C. or more, 200° C. or more, 210° C. or more, 220° C. or more, 230° C. or more, preferably between 240° C. and 290° C.

The PAO may have a specific gravity (15.6/15.6° C., 1 atm/1 atm), as determined by ASTM D4052, of 0.79 to 0.90, preferably 0.80 to 0.89, preferably 0.81 to 0.88, preferably 0.82 to 0.87, 0.83 to 0.86.

Particularly preferred PAOs are those having (a) a flash point of 200° C. or more, 210° C. or more, 220° C. or more, or 230° C. or more; and (b) a pour point less than −20° C., less than −25° C., less than −30° C., less than −35° C., or less than −40° C., and (c) a KV at 100° C. of 2 cSt or more, 4 cSt or more, 5 cSt or more, 6 cSt or more, 8 cSt or more.

Further preferred PAOs have a KV at 100° C. of at least 5 to 50 cSt, particularly 8 to 20 cSt; a pour point of −25 to −75° C., preferably −40 to −60° C.; and a specific gravity of 0.81 to 0.87, preferably 0.82 to 0.86.

The PAO may be comprised of one or more distinct PAO components. In one embodiment, the PAO is a blend of one or more oligomers with different compositions (e.g., different α-olefin(s) were used to make the oligomers) and/or different physical properties (e.g., KV, pour point, VI, and/or $T_g$).

Useful PAOs are available include certain grades of SpectraSyn™ and SpectraSyn Ultra™ available from ExxonMobil Chemical Company (Houston, Tex., USA). Other useful PAOs include certain grades of Synfluid™ available from ChevronPhillips Chemical Company (Pasadena, Tex., USA), Durasyn™ available from Innovene (Chicago, Ill., USA), Nexbase™ available from Neste Oil (Keilaniemi, Finland), and Synton™ available from Chemtura Corporation (Middlebury, Conn., USA).

PBE/PAO Blend Compositions

The compositions described herein may comprise a blend composition of at least one PBE and at least one PAO. In some embodiments, the blend composition may comprise one PBE and one PAO, while in other embodiments, the blend composition may comprise a blend of PBEs blended with one PAO, or one PBE blended with a more than one PAO, or blends of PBEs blended with a blend of PAOs.

The blend composition may comprise, at least about 0.5 wt % PAO, or at least about 1 wt % PAO, or at least about 2 wt % PAO, or at least about 3 wt % PAO, or at least about 4 wt % PAO, or at least about 5 wt % PAO, or at least about 6 wt % PAO, or at least about 7 wt % PAO, or at least about 8 wt % PAO, or at least about 9 wt % PAO, or at least about 10 wt % PAO, based on the weight of the blend composition. The blend composition may comprise up to about 60 wt % PAO, or up to about 55 wt % PAO, or up to about 50 wt % PAO, or up to about 45 wt % PAO, or up to about 40 wt % PAO, or up to about 35 wt % PAO, or up to about 30 wt % PAO, or up to about 25 wt % PAO, or up to about 20 wt % PAO, based on the weight of the blend composition.

In some embodiments, the blend composition may comprise from about 0.5 to 60 wt % PAO, or from about 1 to 50 wt % PAO, or from about 2 to 45 wt % PAO, or from about 5 to 40 wt % PAO. In some embodiments, the blend composition is a lean blend and may comprise from about 0.5 to 20 wt % PAO, or from about 1 to 15 wt % PAO, or from about 2 to 10 wt % PAO, or from about 5 to 9 wt % PAO. In other embodiments, the blend composition is a concentrated blend and may comprise from about 10 to about 60 wt % PAO, or from about 15 to 50 wt % PAO, or from about 20 to 45 wt % PAO, or from about 30 to 45 wt % PAO.

The blend composition may have a Shore A hardness, as determined by ASTM-D2240 in the range of from 10 to 200, or from 20 to 150, or from 30 to 100, or from 40 to 75, or from 45 to 65.

The blend composition may have a MFR, as measured according to ASTM D-1238 (2.16 kg weight @ 230° C.), greater than about 0.5 g/10 min, greater than about 1.0 g/10 min, greater than about 1.5 g/10 min, greater than about 2.0 g/10 min, or greater than about 2.5 g/10 min, or greater than about 3 g/10 min, or greater than about 3.5 g/10 min, or greater than about 4 g/10 min. The blend composition may have an MFR less than about 100 g/10 min, less than about 50 g/10 min, less than about 25 g/10 min, less than about 15 g/10 min, less than about 10 g/10 min, less than about 7 g/10 min. In some embodiments, the blend composition may have an MFR from about 0.5 to about 15 g/10 min, from about 1.0 to about 10 g/10 min, or from about 3 to about 7 g/10 min.

The blend composition may have a Vicat softening point, as measured according to ASTM D-1525 (200 g), of from about 10 to 100° C., or from about 20 to about 75° C., or from about 30 to about 60° C., or from about 35 to 50° C.

In some embodiments, the PBE/PAO blend composition is prepared by a method that comprises combining the PBE and PAO components and then pelletizing the blend compositions. Without being bound by theory, it is believed that, by pelletizing the blend composition before forming a fabricated article or before blending with other components can allow for a more uniform dispersion of the PAO within the PBE is achieved. This in turn allows for a more uniform dispersion of the PAO within the fabricated article or end use blend composition. Therefore, in some embodiments, the roofing compositions described herein may be prepared by a method comprising the steps of: (a) combining (i) a propylene-based elastomer comprising at least about 60 wt % propylene-derived units and about 5 to about 25 wt % ethylene-derived units, based on total weight of the propylene-based elastomer and (ii) a polyalphaolefin to form a blend; (b) pelletizing the blend to form a pellet composition; and (c) blending the pellet composition with other components to form a roofing composition.

In some embodiments, the method of blending the PAO and PBE may be to melt blend the components in an extruder, such as a single-screw extruder or a twin-screw extruder. Extrusion technology for polymer blends is well known in the art, and is described in more detail in, for example, PLASTICS EXTRUSION TECHNOLOGY, F. Hensen, Ed. (Hanser, 1988), pp. 26-37, and in POLYPROPYLENE HANDBOOK, E. P. Moore, Jr. Ed. (Hanser, 1996), pp. 304-348. For example, the PAO may be directly injected into the polymer melt using a liquid injection device at some point along the barrel, as in the case of a twin-screw extruder, or through an opening in a hollow screw shaft, as in the case of a single-screw extruder. PAO is preferably added downstream from the polymer melt zone, but alternatively the PAO can be added at a point where the polymer (s) have not fully melted yet. For example, in a twin-screw extruder, PAO can be injected after the first barrel section (preferably after the first third of the barrel, more preferably in the last third of the barrel). A PAO addition point may be on top of conveying elements of screw, or on top of liquid mixing elements of screw, or prior to kneading elements of screw, or prior to liquid mixing elements of the screw. The extruder may have more than one (preferably two or three) PAO addition points along the barrel or screw shaft. Optionally, the PAO can be added via the extruder feed throat. Other blending methods may utilize a double-cone blender, ribbon blender, or a Farrel Continuous Mixer (FCM™).

Thermoplastic Resin

The compositions described herein may include one or more olefinic thermoplastic resins. The "olefinic thermoplastic resin" may be any material that is not a "propylene-based elastomer" or an "ethylene-based polymer" as described herein. For example, the thermoplastic resin may be a polymer or polymer blend considered by persons skilled in the art as being thermoplastic in nature, e.g., a polymer that softens when exposed to heat and returns to its original condition when cooled to room temperature. The olefinic thermoplastic resin component may contain one or more polyolefins, including polyolefin homopolymers and polyolefin copolymers. Except as stated otherwise, the term "copolymer" means a polymer derived from two or more monomers (including terpolymers, tetrapolymers, etc.), and the term "polymer" refers to any carbon-containing compound having repeat units from one or more different monomers.

Illustrative polyolefins may be prepared from mono-olefin monomers including, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof, and copolymers thereof. Preferably, the olefinic thermoplastic resin is unvulcanized or non cross-linked.

In preferred embodiments, the olefinic thermoplastic resin comprises, or consists of, polypropylene. The term "polypropylene" as used herein broadly means any polymer that is considered a "polypropylene" by persons skilled in the art and includes homo, impact, and random copolymers of propylene. Preferably, the polypropylene used in the compositions described herein has a melting point above 110° C. and includes at least 90 wt % propylene-derived units. The polypropylene may also include isotactic, atactic or syndiotactic sequences, and preferably includes isotactic sequences. The polypropylene can either derive exclusively from propylene monomers (i.e., having only propylene-derived units) or comprises at least 90 wt %, or at least 93 wt %, or at least 95 wt %, or at least 97 wt %, or at least 98 wt %, or at least 99 wt % propylene-derived units with the remainder derived from olefins, such as ethylene, and/or $C_4$-$C_{10}$ α-olefins.

The olefinic thermoplastic resin may have a melting temperature of from at last 110° C., or at least 120 C, or at least 130° C., and may range from 110° C. to 170° C. or higher as measured by DSC.

The thermoplastic resin may have a melt flow rate "MFR" as measured by ASTM D1238 at 230° C. and 2.16 kg weight of from about 0.1 to 100 g/10 min. In some embodiments, the thermoplastic resin may have a fractional MFR, such a polypropylene having a fractional MFR of less than about 2 g/10 min, or less than about 1.5 g/10 min, or less than about 1 g/10 min. In some embodiments, the thermoplastic resin may have a MFR of from a low of about 25, 26, 27, 28, 29, 30, 31, 32, or 33 g/10 min to a high of about 37, 38, 39, 40, 41, 42, 43, 44, or 45 g/10 min, where desirable ranges may include ranges from any lower limit to any upper limit. In some embodiments, the thermoplastic resin, such as a polypropylene, may have a MFR of from a low of about 5, 10, or 15 g/10 min to a high of about 20, 25, or 30 g/10 min, where desirable ranges may include ranges from any lower limit to any upper limit.

Ethylene-Based Copolymer

The compositions described herein may optionally include one or more ethylene-based copolymers, such as an ethylene-based plastomer. Ethylene-based plastomers that may be useful include those comprising ethylene-derived units and one or more olefins selected from propylene and $C_4$-$C_{20}$ olefins (preferably 1-butene, 1-hexene, and/or 1-octene. The ethylene-based plastomer may have an ethylene content of from about 50 to about 90 wt %, from about 60 to about 85 wt %, from about 65 to about 80 wt %, or from about 65 to about 75 wt %, based on the weight of the ethylene-based plastomer, where desirable ranges may include ranges from any lower limit to any upper limit, with the balance being comonomer-derived units. For example, the ethylene-based plastomer may further comprise, (i) butene-derived units in an amount of from greater than 5 wt %, or greater than 10 wt %, or greater than 15 wt %, or greater than 20 wt %, or greater than 25 wt %, and less than 50 wt %; (ii) hexene-derived units in an amount of from greater than 10 wt %, or greater than 20 wt %, or greater than 25 wt %, or greater than 30 wt %, and less than 50 wt %; or (iii) octene-derived units in an amount of greater than 20 wt %, or greater than 25 wt %, or greater than 30 wt %, or greater than 35 wt %, and less than 50 wt %, based on the weight of the ethylene-based plastomer.

Useful ethylene-based plastomers may have one or more of the following properties:

1) a density from a low of 0.85 g/cm$^3$, 0.86 g/cm$^3$, 0.87 g/cm$^3$, 0.88 g/cm$^3$, or 0.885 g/cm$^3$ to a high of 0.91 g/cm$^3$, 0.905 g/cm$^3$, or 0.902 g/cm$^3$. In some embodiments, the ethylene-based plastomer may have a density in the range of from 0.85 to 0.91 g/cm$^3$, or 0.86 to 0.91 g/cm$^3$, or 0.87 to 0.91 g/cm$^3$, or 0.88 to 0.905 g/cm$^3$, or 0.88 to 0.902 g/cm$^3$, or 0.885 to 0.902 g/cm³, where desirable ranges may include ranges from any lower limit to any upper limit;

2) a heat of fusion ($H_f$) of 90 J/g or less, 70 J/g or less, 50 J/g or less, or 30 J/g or less. In some embodiments, the ethylene-based plastomer may have a Hf of from 10 to 70 J/g, or 10 to 50 J/g, or 10 to 30 J/g, where desirable ranges may include ranges from any lower limit to any upper limit;

3) a crystallinity from a low of 5 wt % to a high of 40%, 30%, or 20%, where desirable ranges may include ranges from any lower limit to any upper limit;

4) a melting point ($T_m$, peak first melt) of 100° C. or less, 95° C. or less, 90° C. or less, 80° C. or less, 70° C. or less, 60° C. or less, or 50° C. or less;

5) a crystallization temperature ($T_c$, peak) of 90° C. or less, 80° C. or less, 70° C. or less, 60° C. or less, 50° C. or less, or 40° C. or less;

6) a glass transition temperature ($T_g$) of −20° C. or less, −30° C. or less, or −40° C. or less;

7) a $M_w$ of 30 to 2,000 kg/mol, 50 to 1,000 kg/mol, or 90 to 500 kg/mol, where desirable ranges may include ranges from any lower limit to any upper limit;

8) a $M_w/M_n$ of 1 to 5, 1.4 to 4.5, 1.6 to 4, 1.8 to 3.5, or 1.8 to 2.5, where desirable ranges may include ranges from any lower limit to any upper limit; and/or 9) a melt index (MI, 2.16 kg at 190° C.) of 0.1 to 100 g/10 min, 0.3 to 60 g/10 min, 0.5 to 40 g/10 min, or 0.7 to 20 g/10 min, where desirable ranges may include ranges from any lower limit to any upper limit.

Useful ethylene-based plastomers include certain grades of those commercially available under the trade names EXACT™ (ExxonMobil Chemical Company, Houston, Tex., USA), AFFINITY™, ENGAGE™, FLEXOMER™ (The Dow Chemical Company, Midland, Mich., USA), and TAFMER™ (Mitsui Company, Japan).

Fillers and Additives

The compositions described herein may also incorporate a variety of additives. The additives may include reinforcing and non-reinforcing fillers, antioxidants, stabilizers, processing oils, compatibilizing agents, lubricants (e.g., oleamide), antiblocking agents, antistatic agents, waxes, coupling agents for the fillers and/or pigment, pigments, flame retardants, antioxidants, and other processing aids known to the art. In some embodiments, the additives may comprise up to about 65 wt %, or up to about 60 wt %, or up to about 55 wt %, or up to about 50 wt % of the roofing composition. In some embodiments, the additives may comprise at least 5 wt %, or at least 10 wt %, or at least 15 wt %, or at least 20 wt %, or at least 25 wt %, or at least 30 wt %, or at least 35 wt %, or at least 40 wt % of the roofing composition.

In some embodiments, the roofing composition may include fillers and coloring agents. Exemplary materials include inorganic fillers such as calcium carbonate, clays, silica, talc, titanium dioxide or carbon black. Any type of carbon black can be used, such as channel blacks, furnace blacks, thermal blacks, acetylene black, lamp black and the like.

In some embodiments, the roofing composition may include flame retardants, such as calcium carbonate, inorganic clays containing water of hydration such as aluminum trihydroxides ("ATH") or Magnesium Hydroxide. For example, the calcium carbonate or magnesium hydroxide may be pre-blended into a masterbatch with a thermoplastic resin, such as polypropylene, or a polyethylene, such as linear low density polyethylene. For example, the flame retardant may be pre-blended with a polypropylene, an impact polypropylene-ethylene copolymer, or polyethylene, where the masterbatch comprises at least 40 wt %, or at least 45 wt %, or at least 50 wt %, or at least 55 wt %, or at least 60 wt %, or at least 65 wt %, or at least 70 wt %, or at least 75 wt %, of flame retardant, based on the weight of the masterbatch. The flame retardant masterbatch may then form at least 5 wt %, or at least 10 wt %, or at least 15 wt %, or at least 20 wt %, or at least 25 wt %, of the roofing composition. In some embodiments, the roofing composition comprises from 5 wt % to 40 wt %, or from 10 wt % to 35 wt %, or from 15 wt % to 30 wt % flame retardant masterbatch, where desirable ranges may include ranges from any lower limit to any upper limit.

In some embodiments, the roofing composition may include UV stabilizers, such as titanium dioxide or Tinuvin® XT-850. The UV stabilizers may be introduced into the roofing composition as part of a masterbatch. For example, UV stabilizer may be pre-blended into a masterbatch with a thermoplastic resin, such as polypropylene, or a polyethylene, such as linear low density polyethylene. For example, the UV stabilizer may be pre-blended with a polypropylene, an impact polypropylene-ethylene copolymer, or polyethylene, where the masterbatch comprises at least 5 wt %, or at least 7 wt %, or at least 10 wt %, or at least 12 wt %, or at least 15 wt %, of UV stabilizer, based on the weight of the masterbatch. The UV stabilizer masterbatch may then form at least 5 wt %, or at least 7 wt %, or at least 10 wt %, or at least 15 wt %, of the roofing composition. In some embodiments, the roofing composition comprises from 5 wt % to 30 wt %, or from 7 wt % to 25 wt %, or from 10 wt % to 20 wt % flame retardant masterbatch, where desirable ranges may include ranges from any lower limit to any upper limit.

Still other additives may include antioxidant and/or thermal stabilizers. In an exemplary embodiment, processing and/or field thermal stabilizers may include IRGANOX® B-225 and/or IRGANOX® 1010 available from BASF.

Roofing Compositions

The compositions described herein are particularly useful for roofing applications, such as for thermoplastic polyolefin roofing membranes. Membranes produced from the compositions may exhibit a beneficial combination of properties, and in particular exhibit an improved balance of flexibility at temperatures from −40° C. to 40° C. along with stability at elevated temperatures such as those from 40° C. to 100° C.

The roofing compositions described herein may be made either by pre-compounding or by in-situ compounding using polymer-manufacturing processes such as Banbury mixing or twin screw extrusion. The compositions may then be formed into roofing membranes. The roofing membranes may be particularly useful in commercial roofing applications, such as on flat, low-sloped, or steep-sloped substrates.

The roofing membranes may be fixed over the base roofing by any means known in the art such as via adhesive material, ballasted material, spot bonding, or mechanical spot fastening. For example, the membranes may be installed using mechanical fasteners and plates placed along the edge sheet and fastened through the membrane and into the roof decking. Adjoining sheets of the flexible membranes are overlapped, covering the fasteners and plates, and preferably joined together, for example with a hot air weld. The membrane may also be fully adhered or self adhered to an insulation or deck material using an adhesive. Insulation is typically secured to the deck with mechanical fasteners and the flexible membrane is adhered to the insulation.

The roofing membranes may be reinforced with any type of scrim including, but not limited to, polyester, fiberglass, fiberglass reinforced polyester, polypropylene, woven or non-woven fabrics (e.g. Nylon) or combinations thereof. Preferred scrims are fiberglass and/or polyester.

In some embodiments, a surface layer of the top and/or bottom of the membrane may be textured with various patterns. Texture increases the surface area of the membrane, reduces glare and makes the membrane surface less slippery. Examples of texture designs include, but are not limited to, a polyhedron with a polygonal base and triangular faces meeting in a common vertex, such as a pyramidal base; a cone configuration having a circular or ellipsoidal configurations; and random pattern configurations.

Useful roofing membranes may have a thickness of from 0.1 to 5 mm, or from 0.5 to 4 mm.

The roofing membrane compositions described herein comprise a blend composition of a propylene-based elastomer, thermoplastic resin, at least one flame retardant, and at least one ultraviolet stabilizer. In some embodiments, the blend composition further comprises a polyalphaolefin.

The blend compositions may comprise from about 10 to about 50 wt % of the propylene-based elastomer. For example, the blend composition may comprise at least 20 wt %, or at least 25 wt %, or at least 30 wt %, or at least 35 wt %, or at least 40 wt % of the propylene-based elastomer. In some embodiments, the blend composition comprises less than 45 wt % of the propylene-based elastomer.

The propylene-based elastomer may be any of those described herein. However, in some preferred embodiments, the propylene-based elastomer may have an ethylene content of from 5 to 30 wt %, based upon the weight of the propylene-based elastomer, wherein the propylene-based elastomer is a reactor blend of a first polymer component and a second polymer component, wherein the first polymer component has an ethylene content $R_1$ of from greater than 5 to less than 30 wt % α-olefin, based upon the total weight of the first polymer component, and wherein the second polymer component has an ethylene content $R_2$ of from greater than 1 to less than 10 wt % α-olefin, based upon the total weight of the second polymer component. In some preferred embodiments, the propylene-based elastomer has an ethylene content of from 16 to 18 wt %, a melting temperature of less than 120° C., and a heat of fusion of less than 75 J/g.

The blend composition may comprise from about 5 to about 40 wt % of the thermoplastic resin. For example, the blend composition may comprise at least 7, or at least 10, or at least 12 wt % of the thermoplastic resin. For example, the blend composition may comprise less than 35 wt %, or less than 30 wt %, or less than 25 wt %, or less than 20 wt % of the thermoplastic resin.

The thermoplastic resin may be any of those described herein, however in preferred embodiments the thermoplastic resin comprises polypropylene or an impact propylene copolymer. For example, useful polypropylenes include those that have a MFR (230° C.; 2.16 kg) of greater than 15 g/10 min, or greater than 25 g/10 min, or greater than 30 g/10 min. For example, useful impact propylene copolymers include those that have a MFR (230° C.; 2.16 kg) of less than 30 g/10 min, or less than 10 g/10 min, or less than 5 g/10 min.

The blend composition may comprise from about 1 to about 10 wt % of the polyalphaolefin. For example, the blend composition may comprise less than 9 wt %, or less than 8 wt %, or less than 7 wt %, or less than 6 wt %, or less than 5 wt %, or less than 4 wt % of the polyalphaolefin. For example, the blend composition may comprise at least 2 wt % or at least 3 wt % of the polyalphaolefin.

The polyalphaolefin may be any of those described herein, however, in preferred embodiments the polyolefin has a kinematic viscosity of from 3 to 3000 cSt at 100° C., or from 5 to 100 cSt, or from 5 to 50 cSt. Particularly useful polyalphaolefins include those that comprise oligomers of 1-octene, 1-decene, 1-dodecene, and blends thereof.

In some embodiments, the propylene-based elastomer and polyalphaolefin are first blended together to form a masterbatch prior to being blended with the remaining ingredients to form the blend composition. This can allow for a more uniform dispersion of the PAO within the PBE, and thus a more uniform dispersion of the PAO within the blend composition.

The blend composition may comprise from about 1 wt % to about 40 wt % of flame retardant. For example, the blend composition may comprise at least 3 wt %, or at least 5 wt %, or at least 7 wt %, or at least 10 wt %, or at least 12 wt %, or at least 15 wt %, or at least 17 wt %, or at least 20 wt % of one or more flame retardants. For example, the blend composition may comprise less than 40 wt %, or less than 35 wt %, or less than 30 wt %, or less than 25 wt % of one or more flame retardants. In some embodiments, the blend composition comprises from 10 to 30 wt %, or from 15 to 25 wt %, of at least one flame retardant.

The blend composition may comprise from about 1 wt % to about 15 wt % of at least one ultraviolet stabilizer. For example, the blend composition may comprise less than 12 wt %, or less than 10 wt %, or less than 7 wt %, or less than 5 wt %, of ultraviolet stabilizer.

The blend composition may further comprise an ethylene-based polymer. For example, the blend composition may further comprise an ethylene-based plastomer having a glass transition temperature (Tg) of from −40 to −50° C.

The blend composition may have an MFR (230° C.; 2.16 kg) of less than 10 g/10 min, or less than 7 g/10 min, or less than 5 g/10 min.

The blend composition may have has at least three, or at least four, or at least five, or at least six, or at least seven, or at least eight, or all nine, of the following properties:
(i) a storage modulus (E') at −40° C. of less than $2.5\times10^{10}$, or less than $2.4\times10^{10}$, or less than $2.3\times10^{10}$, or less than $2.2\times10^{10}$, or less than $2.1\times10^{10}$ dynes/cm$^2$;
(ii) a storage modulus (E') at −30° C. of less than $1.5\times10^{10}$, or less than $1.4\times10^{10}$, or less than $1.3\times10^{10}$ dynes/cm$^2$;
(iii) a storage modulus (E') at −20° C. of less than $5\times10^9$, or less than $4.5\times10^9$, or less than $4\times10^9$ dynes/cm$^2$;
(iv) a storage modulus (E') at 0° C. of less than $2\times10^9$ dynes/cm$^2$;
(v) a storage modulus (E') at 20° C. of less than $1.5\times10^9$, or less than $1.4\times10^9$, or less than $1.3\times10^9$ dynes/cm$^2$;
(vi) a storage modulus (E') at 40° C. of greater than $6.5\times10^8$, or greater than $7\times10^8$, or greater than $7.5\times10^8$ dynes/cm$^2$;
(vii) a storage modulus (E') at 60° C. of greater than $4\times10^8$, or greater than $4.1\times10^8$, or greater than $4.2\times10^8$, or greater than $4.3\times10^8$, or greater than $4.4\times10^8$ dynes/cm$^2$;
(viii) a storage modulus (E') at 80° C. of greater than $2\times10^8$, or greater than $2.2\times10^8$, or greater than $2.3\times10^8$, or greater than $2.5\times10^8$, or greater than $2.6\times10^8$ dynes/cm$^2$; or
(ix) a storage modulus (E') at 100° C. of greater than $1\times10^8$, or greater than $1.2\times10^8$, or greater than $1.3\times10^8$, or greater than $1.4\times10^8$, or greater than $1.5\times10^8$ dynes/cm$^2$.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

The test methods used in the Examples are listed in Table 1 below.

TABLE 1

| Test Methods | |
| --- | --- |
| Property Tested | Test Method |
| Tensile Stress at Break | ASTM D412 |
| Tensile Strain at Break | ASTM D412 |
| 1% Secant Modulus | ASTM D790-10B |
| 100%, 200%, and 300% Modulus | ASTM D412 |
| Tear Strength | ASTM D624 |
| Melt Flow Rate | ASTM D1238 |

Dynamic Mechanical Thermal Analysis ("DMTA") tests were conducted on samples made in the Examples to provide information about the small-strain mechanical response of the sample as a function of temperature. Sample specimens were tested using a commercially available DMA instrument (e.g., TA Instruments DMA 2980 or Rheometrics RSA) equipped with a dual cantilever test fixture. The specimen was cooled to −130° C. and then heated to 60° C. at a rate of 2° C./min while being subjected to an oscillatory deformation at 0.1% strain and a frequency of 6.3 rad/sec. The output of the DMTA test is the storage modulus (E') and the loss modulus (E"). The storage modulus indicates the elastic response or the ability of the material to store energy, and the loss modulus indicates the viscous response or the ability of the material to dissipate energy. Tangent delta is the ratio of the loss modulus to storage modulus (E"/E'). Glass transition temperature (Tg) is defined to be the temperature associated with either the peak loss modulus (E") or the peak in tangent delta.

In the Examples, "PP3155" was ExxonMobil™ PP 3155 polypropylene available from ExxonMobil Chemical Company. PP3155 is a polypropylene homopolymer with a density of 0.9 g/cc and a melt mass-flow rate (MFR) (230° C.; 2.16 kg) of 36 g/10 min (ASTM D1238).

In the Examples, "PP7032" was ExxonMobil™ PP 7032E2 polypropylene available from ExxonMobil Chemical Company. PP7032 is a polypropylene impact copolymer having a density of 0.9 g/cc and a melt mass-flow rate (MFR) (230° C.; 2.16 kg) of 4.0 g/10 min (ASTM D1238).

Engage™ 8150 polyolefin elastomer is an ethylene-octene copolymer available from The Dow Chemical Company. Engage 8150 has the following typical properties: a density of 0.868 g/cc (ASTM D792); a melt index (190° C.; 2.15 kg) of 0.5 g/10 min (ASTM D1238); a Mooney viscosity (ML 1+4 @ 121° C.) of 33; a Shore A hardness (1 sec) of 70 (ASTM D2240); a Shore D hardness (1 sec) of 20 (ASTM D2240), a Vicat softening point of 46° C. (ASTM D1525); and a DSC melting point of 55° C. (measured at 10° C./min rate).

Exact™ 9061 plastomer is available from ExxonMobil Chemical Company. Exact 9061 is an ethylene-butene copolymer that has the following typical properties: a density of 0.863 g/cc; a melt index (190° C.; 2.16 kg) of 0.55 g/10 min (ASMM D1238); a Shore A durometer hardness of 60 (ASTM D2240), a Vicat softening temperature of 42.3° C.; and a peak melting temperature of 37° C.

Hifax CA10A is a reactor thermoplastic polyolefin available from Lyondell/Basell Industries. Hifax CA10A has a density of 0.88 g/cc, a melt flow rate (230° C.; 2.16 kg) of 0.6 g/10 min, a Vicat softening temperature of 60° C., a melting temperature of 142° C., and a Shore D hardness of 30.

The Flame Retardant Concentrate used in the examples was a masterbatch concentrate of LLDPE and 80% calcium carbonate.

The UV Stabilizer Concentrate used in the examples was a masterbatch containing 16% titanium dioxide.

In the Examples, "VM6102" was Vistamaxx™ 6102 propylene-based elastomer available from ExxonMobil Chemical Company. VM6102 is a propylene-ethylene copolymer containing 16 wt % ethylene-derived units and has the following typical properties: a density of 0.862 g/cc (ASTM D1505), a melt index (190° C.; 2.16 kg) of 1.4 g/10 min (ASTM D1238), a melt mass-flow rate (MFR) (230° C.; 2.16 kg) of 3 g/10 min (ASTM D1238), a Shore A durometer hardness of 66 (ASTM D224), and a Vicat softening temperature of 52.2° C.

PBE-A was a metallocene-catalyzed reactor-blended copolymer of two reactor components (R1 and R2) prepared in parallel solution polymerization reactors as described herein. The R1 component of PBE-A contained 17-19 wt % ethylene-derived units with the balance being propylene-derived units. The R2 component of PBE-A contained 3-5 wt % ethylene-derived units with the balance being propylene-derived units. PBE-A had an overall ethylene content of about 17 wt % with the balance being propylene-derived units. PBE-A had a density of about 0.861 g/cc (ASTM D1505), a melt index (190° C.; 2.16 kg) of about 1.3 g/10 min, a melt mass-flow rate (MFR) (230° C.; 2.16 kg) of about 3 g/10 min, and a Vicat softening temperature of about 50.8° C.

PBE-B was a pelletized blend composition that was prepared by melt blending PBE-A and a polyalphaolefin ("PAO") having the properties listed in Table 2. PBE-B had a density of about 0.859 g/cc (ASTM D1505); a melt index (190° C.; 2.16 kg) of about 1.8 g/10 min (ASTM D1238); a melt mass-flow rate (MFR) (230° C.; 2.16 kg) of about 4.5 g/10 min (ASTM D1238), and a Vicat Softening Temperature of about 44.5° C.

The specific gravity of the PAO at 15.6° C. can be measured by ASTM D4052. The kinetic viscosities of the PAO at 40° C. and 100° C. can be measured by ASTM D445. The Viscosity Index of the PAO can be measured at ASTM D2270. The pour point of the PAO can be measured by ASTM D5950/D97. The flash point (COC) of the PAO can be measured by ASTM D92. The molecular weight of the PAO can be determined by GPC method using a column for medium to low molecular weight polymers, tetrahydrofuran as solvent and polystyrene as calibration standard, correlated with the fluid viscosity according to a power equation. Unless otherwise indicated Mw values reported herein are GPC values and are not calculated from kinematic viscosity at 100° C.

TABLE 2

| | SG @ 15.6° C. | KV @ 100° C. | KV @ 40° C. | VI | Pour Point, ° C. | Flash Point (COC)° C. | Mw |
|---|---|---|---|---|---|---|---|
| PAO | 0.835 | 10.0 cSt | 66 cSt | 137 | −48 | 266 | <1000 g/mole |

Example 1

The various ingredients of the sample formulations of Example 1 were tumble blended and then introduced directly into the extruder hopper of a Thermal Prism™ twin screw extruder that was operated at a melt temperature of 230° C. The temperature settings of the zones in the twin screw extruder were as described in Table 3. The feed rate and the extruder speed were adjusted to maintain a steady flow of ingredients into the extruder. The formulations compounded in the extruder were separated by hand into smaller fragments to facilitate processing. The resulting formulations were then compression moulded to a thickness of 125 mils and tested for various mechanical properties.

TABLE 3

Twin Screw Extruder Temperature Profile

| Zone | Temperature |
|---|---|
| Zone 1 | 140° C. |
| Zone 2 | 180° C. |
| Zone 3 | 220° C. |
| Zone 4 | 220° C. |
| Zone 5 | 230° C. |
| Zone 6 | 230° C. |

In Example 1, samples of the formulations in Table 4 were prepared. The amount of each ingredient in the formulation is listed in Table 4 in weight percent, based on the total weight of the formulation. The resulting samples were tested for various properties with the results shown in Table 5.

TABLE 4

Example 1 Formulations

| | C1 | C2 | 1 | 2 | 3 | 4 | 5 | 6 |
|---|---|---|---|---|---|---|---|---|
| VM6102 | — | 10.1 | 42.0 | 33.6 | 42.0 | — | — | — |
| PBE-A | — | — | — | — | — | 42.0 | 39.2 | — |
| PBE-B | — | — | — | — | — | — | — | 42.0 |
| PP3155 | — | — | 14.0 | 14.0 | — | 14.0 | 16.8 | — |
| PP7032 | — | — | — | — | 14.0 | — | — | 14.0 |
| Engage 8150 | — | — | — | 8.4 | — | — | — | — |
| Hifax CA10A | 56.0 | 45.9 | — | — | — | — | — | — |
| Flame Retardant Concentrate | 28.0 | 28.0 | 28.0 | 28.0 | 28.0 | 28.0 | 28.0 | 28.0 |
| UV Stabilizer Concentrate | 16.0 | 16.0 | 16.0 | 16.0 | 16.0 | 16.0 | 16.0 | 16.0 |
| Total (wt %) | 100.0 | 100.0 | 100.0 | 100.0 | 100.0 | 100.0 | 100.0 | 100.0 |

TABLE 5

Example 1 Properties

| | | C1 | C2 | 1 | 2 | 3 | 4 | 5 | 6 |
|---|---|---|---|---|---|---|---|---|---|
| Calculated Compound Density | g/cc | 1.061 | 1.058 | 1.054 | 1.055 | 1.054 | 1.054 | 1.055 | 1.54 |
| Melt Flow Rate (230° C.; 2.16 kg) | g/10 min | 1.0 | 1.3 | 5.0 | 4.7 | 3.2 | 4.7 | 5.1 | 4.1 |
| 1% Secant (Flexural) Modulus | psi | 27708 | 24779 | 22209 | 23026 | 20699 | 18122 | 26713 | 15145 |
| Tan Delta (peak value) | ° C. | −24 | −23 | −23 | −24 | −24 | −24 | −25 | −28 |
| E" (peak value) | ° C. | −29 | −28 | −26 | −26 | −27 | −27 | −28 | −31 |
| E' at −60° C. | dyne/cm$^2$ | $1.47 \times 10^{10}$ | $2.69 \times 10^{10}$ | $2.99 \times 10^{10}$ | $1.86 \times 10^{10}$ | $2.88 \times 10^{10}$ | $1.77 \times 10^{10}$ | $1.72 \times 10^{10}$ | $2.33 \times 10^{10}$ |
| E' at −50° C. | dyne/cm$^2$ | $1.40 \times 10^{10}$ | $2.60 \times 10^{10}$ | $2.86 \times 10^{10}$ | $1.79 \times 10^{10}$ | $2.74 \times 10^{10}$ | $1.70 \times 10^{10}$ | $1.65 \times 10^{10}$ | $2.23 \times 10^{10}$ |
| E' at −40° C. | dyne/cm$^2$ | $1.24 \times 10^{10}$ | $2.28 \times 10^{10}$ | $2.74 \times 10^{10}$ | $1.74 \times 10^{10}$ | $2.57 \times 10^{10}$ | $1.65 \times 10^{10}$ | $1.57 \times 10^{10}$ | $2.05 \times 10^{10}$ |
| E' at −30° C. | dyne/cm$^2$ | $8.69 \times 10^{9}$ | $1.61 \times 10^{10}$ | $2.32 \times 10^{10}$ | $1.55 \times 10^{10}$ | $2.14 \times 10^{10}$ | $1.49 \times 10^{10}$ | $1.31 \times 10^{10}$ | $1.25 \times 10^{10}$ |
| E' at −20° C. | dyne/cm$^2$ | $3.88 \times 10^{9}$ | $5.03 \times 10^{9}$ | $4.39 \times 10^{9}$ | $4.89 \times 10^{9}$ | $4.85 \times 10^{9}$ | $3.73 \times 10^{9}$ | $3.25 \times 10^{9}$ | $3.65 \times 10^{9}$ |
| E' at 0° C. | dyne/cm$^2$ | $1.64 \times 10^{9}$ | $2.11 \times 10^{9}$ | $1.74 \times 10^{9}$ | $2.24 \times 10^{9}$ | $2.26 \times 10^{9}$ | $1.64 \times 10^{9}$ | $1.40 \times 10^{9}$ | $1.95 \times 10^{9}$ |
| E' at 20° C. | dyne/cm$^2$ | $1.04 \times 10^{9}$ | $1.31 \times 10^{9}$ | $1.20 \times 10^{9}$ | $1.45 \times 10^{9}$ | $1.57 \times 10^{9}$ | $1.07 \times 10^{9}$ | $8.61 \times 10^{8}$ | $1.28 \times 10^{9}$ |

TABLE 5-continued

Example 1 Properties

|  |  | C1 | C2 | 1 | 2 | 3 | 4 | 5 | 6 |
|---|---|---|---|---|---|---|---|---|---|
| E' at 40° C. | dyne/cm$^2$ | 6.50 × 10$^8$ | 6.83 × 10$^8$ | 6.03 × 10$^8$ | 9.84 × 10$^8$ | 8.65 × 10$^8$ | 8.15 × 10$^8$ | 6.78 × 10$^8$ | 7.88 × 10$^8$ |
| E' at 60° C. | dyne/cm$^2$ | 3.49 × 10$^8$ | 3.40 × 10$^8$ | 3.43 × 10$^8$ | 6.49 × 10$^8$ | 4.86 × 10$^8$ | 5.12 × 10$^8$ | 4.39 × 10$^8$ | 4.56 × 10$^8$ |
| E' at 80° C. | dyne/cm$^2$ | 2.18 × 10$^8$ | 1.79 × 10$^8$ | 1.96 × 10$^8$ | 3.76 × 10$^8$ | 2.68 × 10$^8$ | 3.00 × 10$^8$ | 2.63 × 10$^8$ | 2.72 × 10$^8$ |
| E' at 100° C. | dyne/cm$^2$ | 1.38 × 10$^8$ | 9.59 × 10$^7$ | 1.15 × 10$^8$ | 2.24 × 10$^8$ | 1.47 × 10$^8$ | 1.80 × 10$^8$ | 1.57 × 10$^8$ | 1.63 × 10$^8$ |
| 100% Modulus | psi | 596 | 498 | 579 | 671 | 446 | 475 | 576 | 410 |
| 200% Modulus | psi | 631 | 525 | 642 | 797 | 492 | 525 | 637 | 434 |
| 300% Modulus | psi | 672 | 560 | 711 | 908 | 542 | 585 | 703 | 473 |
| Tensile Stress @ Yield | MPa | 4.5 | 3.7 | 3.8 | 4.1 | 3.0 | 3.2 | 3.9 | 2.8 |
| Tensile Strain @ Yield | % | 19.2 | 17.7 | 29.3 | 29.1 | 29.3 | 24.0 | 19.2 | 15.3 |
| Tensile Stress @ Break | MPa | 8.2 | 6.5 | 8.7 | 9.4 | 8.5 | 8.4 | 7.7 | 5.3 |
| Tensile Strain @ Break | % | 1035 | 964 | 1049 | 952 | 1406 | 1311 | 928 | 993 |

As seen in Table 5, the 1% Secant Modulus (flexural modulus) of Samples 1 to 3 is lower than that of Samples C1 and C2. FIG. 1 shows a plot of how the elastic modulus (E') of the Samples C1, C2, 1, 2, and 3 varied with temperature. As seen in FIG. 1, Sample C2, which contained propylene-based elastomer as a minor component (about 10 wt %), exhibited a similar modulus as Sample C1 at temperatures below −40° C., and a lower modulus as compared to Sample C1 at other temperatures. This indicates that Sample C2 had enhanced flexibility as compared to Sample C1. Samples 1 to 3 exhibited a modulus similar to Sample C2 at temperatures ranging from −40° C. to 40° C. However, at higher temperatures the modulus values of Samples 2 and 3 approached or exceeded that of Sample C1. Thus as seen in FIG. 1, the formulations of Examples 1 to 3 possessed the flexibility of Sample C2 at service temperatures for roofing membranes (−40° C. to 40° C.) and enhanced modulus at elevated temperatures (e.g., 100° C.) as compared to Sample C2.

Figure 2:
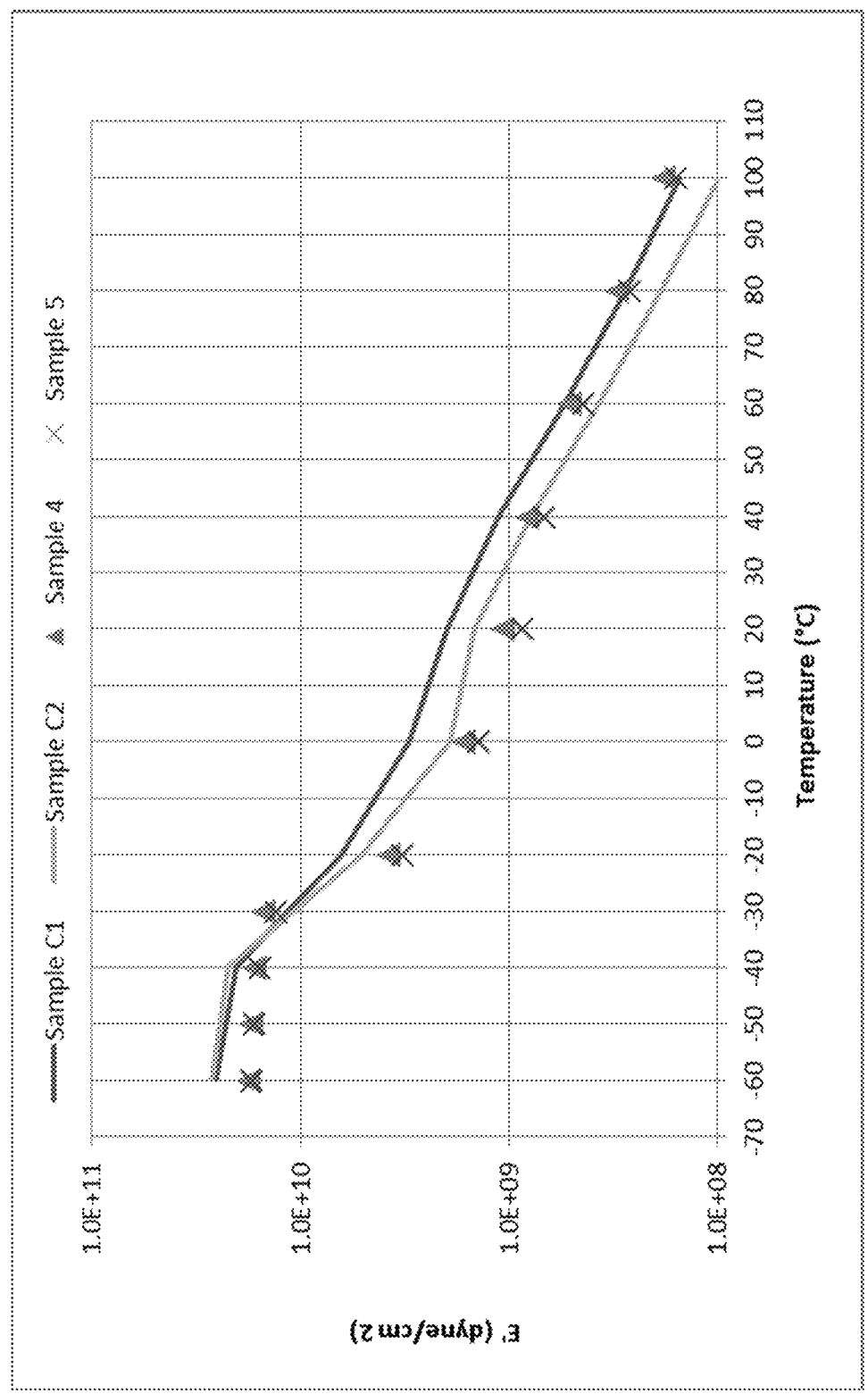
FIG. 2 illustrates the storage modulus (E') of Samples C1, C2, 4, and 5.

As seen in Table 5, the 1% secant modulus (flexural modulus) of Sample 4 is lower than that of Samples C1 and C2. FIG. 2 shows a plot of how the elastic modulus (E') of the Samples C1, C2, 4, and 5 varied with temperature. As seen in FIG. 2, Samples 4 and 5 exhibited a modulus similar to or lower than that of Sample C2 in a temperature range of −40° C. to 40° C. At higher temperatures, the modulus values of Samples 4 and 5 approached that of Example C1.

Figure 3:
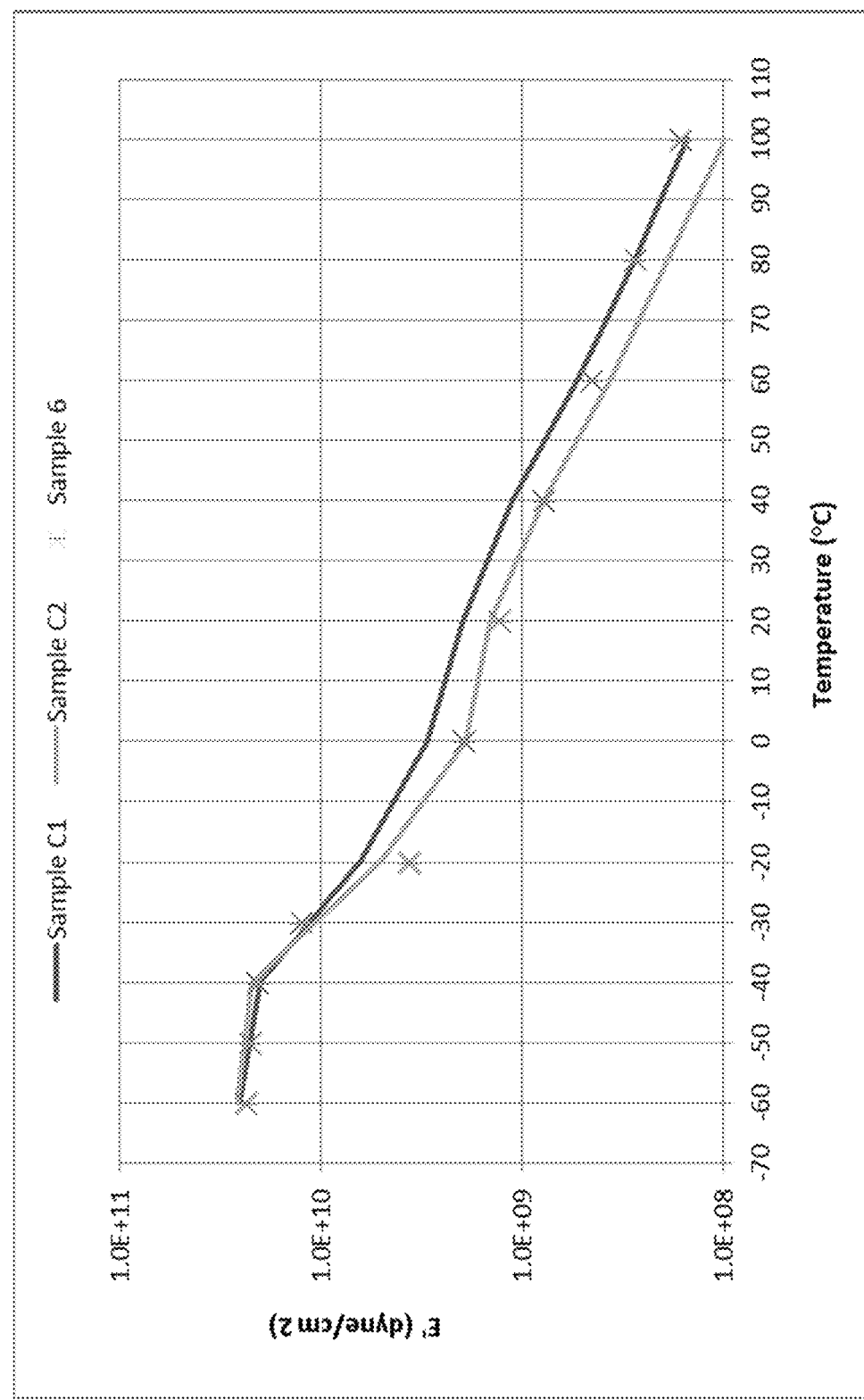
FIG. 3 illustrates the storage modulus (E') of the Samples C1, C2, and 6.

As seen in Table 5, the 1% secant modulus (flexural modulus) of Sample 6 is lower than that of Samples C1 and C2. FIG. 3 shows a plot of how the elastic modulus (E') of the Samples C1, C2, and 6 varied with temperature. As seen in FIG. 3, Sample 6 displays a modulus similar to Sample C2 at temperatures from −40° C. to 40° C. However, at higher temperatures the modulus values approach that of Sample C1.

Example 2

Samples of the formulations in Table 6 were prepared by the method described with reference to Example 1. The amount of each ingredient in the formulation is listed in Table 6 in weight percent, based on the total weight of the formulation. The resulting samples were tested for various properties with the results shown in Table 7.

TABLE 6

Example 2 Formulations

|  | C1 | C2 | 21 | 22 | 23 | 24 | 25 | 26 |
|---|---|---|---|---|---|---|---|---|
| VM6102 | — | 10.1 | 39.2 | 39.2 | 33.6 | — | — | — |
| PBE-A | — | — | — | — | — | 42.0 | — | — |
| PBE-B | — | — | — | — | — | — | 42.0 | 39.2 |
| PP3155 | — | — | 16.8 | — | — | — | 14.0 | 16.8 |
| PP7032 | — | — | — | 16.8 | 14.0 | 14.0 | — | — |
| Engage 8150 | — | — | — | — | 8.4 | — | — | — |
| Hifax CA10A | 56.0 | 45.9 | — | — | — | — | — | — |
| Flame Retardant Concentrate | 28.0 | 28.0 | 28.0 | 28.0 | 28.0 | 28.0 | 28.0 | 28.0 |
| UV Stabilizer Concentrate | 16.0 | 16.0 | 16.0 | 16.0 | 16.0 | 16.0 | 16.0 | 16.0 |
| Total (wt %) | 100.0 | 100.0 | 100.0 | 100.0 | 100.0 | 100.0 | 100.0 | 100.0 |

TABLE 7

Example 2 Properties

|  |  | C1 | C2 | 21 | 22 | 23 | 24 | 25 | 26 |
|---|---|---|---|---|---|---|---|---|---|
| Calculated Compound Density | g/cc | 1.061 | 1.058 | 1.056 | 1.056 | 1.055 | 1.054 | 1.054 | 1.055 |
| Melt Flow Rate (230° C.; 2.16 kg) | g/10 min | 1.0 | 1.3 | 5.3 | 3.1 | 3.0 | 3.2 | 6.7 | 8.1 |

TABLE 7-continued

Example 2 Properties

| | | C1 | C2 | 21 | 22 | 23 | 24 | 25 | 26 |
|---|---|---|---|---|---|---|---|---|---|
| 1% Secant (Flexural) Modulus | psi | 27708 | 24779 | 56232 | 21086 | 26262 | 12421 | 41638 | 53281 |
| Tan Delta (peak value) | °C. | −24 | −23 | −23 | −24 | −24 | −24 | −26 | −27 |
| E″ (peak value) | °C. | −29 | −28 | −26 | −27 | −27 | −27 | −30 | −30 |
| E′ at −60° C. | dyne/cm$^2$ | $1.47 \times 10^{10}$ | $2.69 \times 10^{10}$ | $2.08 \times 10^{10}$ | $2.89 \times 10^{10}$ | $2.16 \times 10^{10}$ | $1.92 \times 10^{10}$ | $1.98 \times 10^{10}$ | $3.21 \times 10^{10}$ |
| E′ at −50° C. | dyne/cm$^2$ | $1.40 \times 10^{10}$ | $2.60 \times 10^{10}$ | $2.01 \times 10^{10}$ | $2.73 \times 10^{10}$ | $2.03 \times 10^{10}$ | $1.85 \times 10^{10}$ | $1.91 \times 10^{10}$ | $3.03 \times 10^{10}$ |
| E′ at −40° C. | dyne/cm$^2$ | $1.24 \times 10^{10}$ | $2.28 \times 10^{10}$ | $1.95 \times 10^{10}$ | $2.57 \times 10^{10}$ | $1.84 \times 10^{10}$ | $1.74 \times 10^{10}$ | $1.84 \times 10^{10}$ | $2.91 \times 10^{10}$ |
| E′ at −30° C. | dyne/cm$^2$ | $8.69 \times 10^{9}$ | $1.61 \times 10^{10}$ | $1.74 \times 10^{10}$ | $2.05 \times 10^{10}$ | $1.51 \times 10^{10}$ | $1.47 \times 10^{10}$ | $1.23 \times 10^{10}$ | $2.03 \times 10^{10}$ |
| E′ at −20° C. | dyne/cm$^2$ | $3.88 \times 10^{9}$ | $5.03 \times 10^{9}$ | $3.76 \times 10^{9}$ | $4.41 \times 10^{9}$ | $3.52 \times 10^{9}$ | $1.82 \times 10^{9}$ | $2.42 \times 10^{9}$ | $6.69 \times 10^{9}$ |
| E′ at 0° C. | dyne/cm$^2$ | $1.64 \times 10^{9}$ | $2.11 \times 10^{9}$ | $1.45 \times 10^{9}$ | $2.27 \times 10^{9}$ | $1.49 \times 10^{9}$ | $6.50 \times 10^{8}$ | $1.13 \times 10^{9}$ | $3.58 \times 10^{9}$ |
| E′ at 20° C. | dyne/cm$^2$ | $1.04 \times 10^{9}$ | $1.31 \times 10^{9}$ | $1.01 \times 10^{9}$ | $1.60 \times 10^{9}$ | $9.58 \times 10^{8}$ | $3.97 \times 10^{8}$ | $7.34 \times 10^{8}$ | $2.37 \times 10^{9}$ |
| E′ at 40° C. | dyne/cm$^2$ | $6.50 \times 10^{8}$ | $6.83 \times 10^{8}$ | $5.79 \times 10^{8}$ | $8.02 \times 10^{8}$ | $5.16 \times 10^{8}$ | $3.04 \times 10^{8}$ | $4.50 \times 10^{8}$ | $1.33 \times 10^{9}$ |
| E′ at 60° C. | dyne/cm$^2$ | $3.49 \times 10^{8}$ | $3.40 \times 10^{8}$ | $3.27 \times 10^{8}$ | $4.40 \times 10^{8}$ | $3.38 \times 10^{8}$ | $1.90 \times 10^{8}$ | $2.55 \times 10^{8}$ | $7.22 \times 10^{8}$ |
| E′ at 80° C. | dyne/cm$^2$ | $2.18 \times 10^{8}$ | $1.79 \times 10^{8}$ | $1.77 \times 10^{8}$ | $2.39 \times 10^{8}$ | $1.84 \times 10^{8}$ | $1.11 \times 10^{8}$ | $1.51 \times 10^{8}$ | $4.29 \times 10^{8}$ |
| E′ at 100° C. | dyne/cm$^2$ | $1.38 \times 10^{8}$ | $9.59 \times 10^{7}$ | $1.03 \times 10^{8}$ | $1.41 \times 10^{8}$ | $1.02 \times 10^{8}$ | $6.19 \times 10^{7}$ | $8.53 \times 10^{7}$ | $2.59 \times 10^{8}$ |
| 100% Modulus | psi | 596 | 498 | 683 | 548 | 494 | 411 | 425 | 522 |
| 200% Modulus | psi | 631 | 525 | 758 | 606 | 553 | 457 | 467 | 563 |
| 300% Modulus | psi | 672 | 560 | 830 | 664 | 619 | 505 | 506 | 616 |
| Tensile Stress @ Yield | MPa | 4.5 | 3.7 | 4.5 | 3.9 | 3.3 | No Yield | 2.8 | 3.7 |
| Tensile Strain @ Yield | % | 19.2 | 17.7 | 29.4 | 17.0 | 22.9 | No Yield | 25.1 | 17.7 |
| Tensile Stress @ Break | MPa | 8.2 | 6.5 | 10.2 | 7.6 | 7.5 | 7.9 | 6.9 | 6.9 |
| Tensile Strain @ Break | % | 1035 | 964 | 1132 | 960 | 1052 | 1536 | 1221 | 944 |

Example 3

The various ingredients of the sample formulations for Example 3 were tumble blended and then introduced into the feed hopper of a 1.5 inch single screw extruder equipped with a sheeting die that was operated at a melt temperature of 200° C. The die gaps of the sheeting die were adjusted to maintain uniformity in thickness along the width of the sheet profiles being produced. The extruder speed and take-up roll velocity were adjusted to maintain sheet thickness within the desired range. Sheet profiles were produced with width's ranging from 8 to 9 inches and a thickness of from 40 to 60 mils.

Samples of the formulations in Table 8 were prepared. The amount of each ingredient is listed in Table 8 in weight percent, based on the total weight of the formulation.

The resulting samples were tested for various properties with the results also shown in Table 10. The 100% modulus, measured in both the machine direction (MD) and cross direction (CD) gives an indication of the flexibility of the sheet. As seen in Table 9, Samples 7 through 11 exhibited similar or lower 100% modulus (in either MD or CD) as compared to Sample C4. Other physical properties, such as tensile strength and elongation (tensile strain), of Samples 7 through 11 were similar to that of Samples C3 and C4. Thus, Samples 7 through 11 exhibited flexibility similar (or improved) to Samples C4 without compromising the other physical properties.

TABLE 8

Example 3 Formulations

| | C3 | C4 | 7 | 8 | 9 | 10 | 11 |
|---|---|---|---|---|---|---|---|
| VM6102 | — | 10.1 | 33.6 | 42.0 | 33.6 | — | — |
| PBE-A | — | — | — | — | — | 42.0 | — |
| PBE-B | — | — | — | — | — | — | 42.0 |
| PP3155 | — | — | 14.0 | — | — | — | — |
| Exact 9061 | — | — | 8.4 | — | 8.4 | — | — |
| PP7032 | — | — | — | 14.0 | 14.0 | 14.0 | 14.0 |
| Hifax CA10A | 56.0 | 45.9 | — | — | — | — | — |
| Flame Retardant Concentrate | 28.0 | 28.0 | 28.0 | 28.0 | 28.0 | 28.0 | 28.0 |
| UV Stabilizer Concentrate | 16.0 | 16.0 | 16.0 | 16.0 | 16.0 | 16.0 | 16.0 |
| Total (wt %) | 100.0 | 100.0 | 100.0 | 100.0 | 100.0 | 100.0 | 100.0 |

TABLE 9

Example 3 Properties

| | | C3 | C4 | 7 | 8 | 9 | 10 | 11 |
|---|---|---|---|---|---|---|---|---|
| Tensile Stress at Break MD | MPa | 16 | 17 | 15 | >17.5 | >18.7 | >18.6 | >17.0 |
| Tensile Stress at Break CD | MPa | 10 | 11 | 10 | 10 | 10 | 12 | >9.8 |
| Tensile Strain at Break MD | % | 877 | 945 | 998 | >1000 | >1000 | >1000 | >1000 |
| Tensile Strain at Break CD | % | 850 | 894 | 869 | 896 | 891 | 996 | >1000 |
| 100% Modulus MD | MPa | 6.1 | 5.9 | 4.9 | 5.6 | 6.3 | 5.1 | 4.9 |
| 100% Modulus CD | MPa | 4.2 | 3.8 | 3.9 | 3.5 | 3.7 | 3.4 | 2.9 |
| Tear Strength MD | KN/m | 55.2 | 55.2 | 47.8 | 43.4 | 50.8 | 43.2 | 39.9 |
| Tear Strength CD | KN/m | 45.8 | 39.9 | 47.4 | 42.3 | 42.2 | 40.8 | 36.1 |
| E' at 20° C. | dyne/cm$^2$ | $1.83 \times 10^9$ | $1.03 \times 10^9$ | $1.22 \times 10^9$ | $1.11 \times 10^9$ | $1.78 \times 10^9$ | $1.31 \times 10^9$ | $1.82 \times 10^9$ |
| E' at 100° C. | dyne/cm$^2$ | $1.26 \times 10^8$ | $9.35 \times 10^7$ | $1.09 \times 10^8$ | $1.14 \times 10^8$ | $1.32 \times 10^8$ | $1.62 \times 10^8$ | $1.30 \times 10^8$ |

Figure 4:
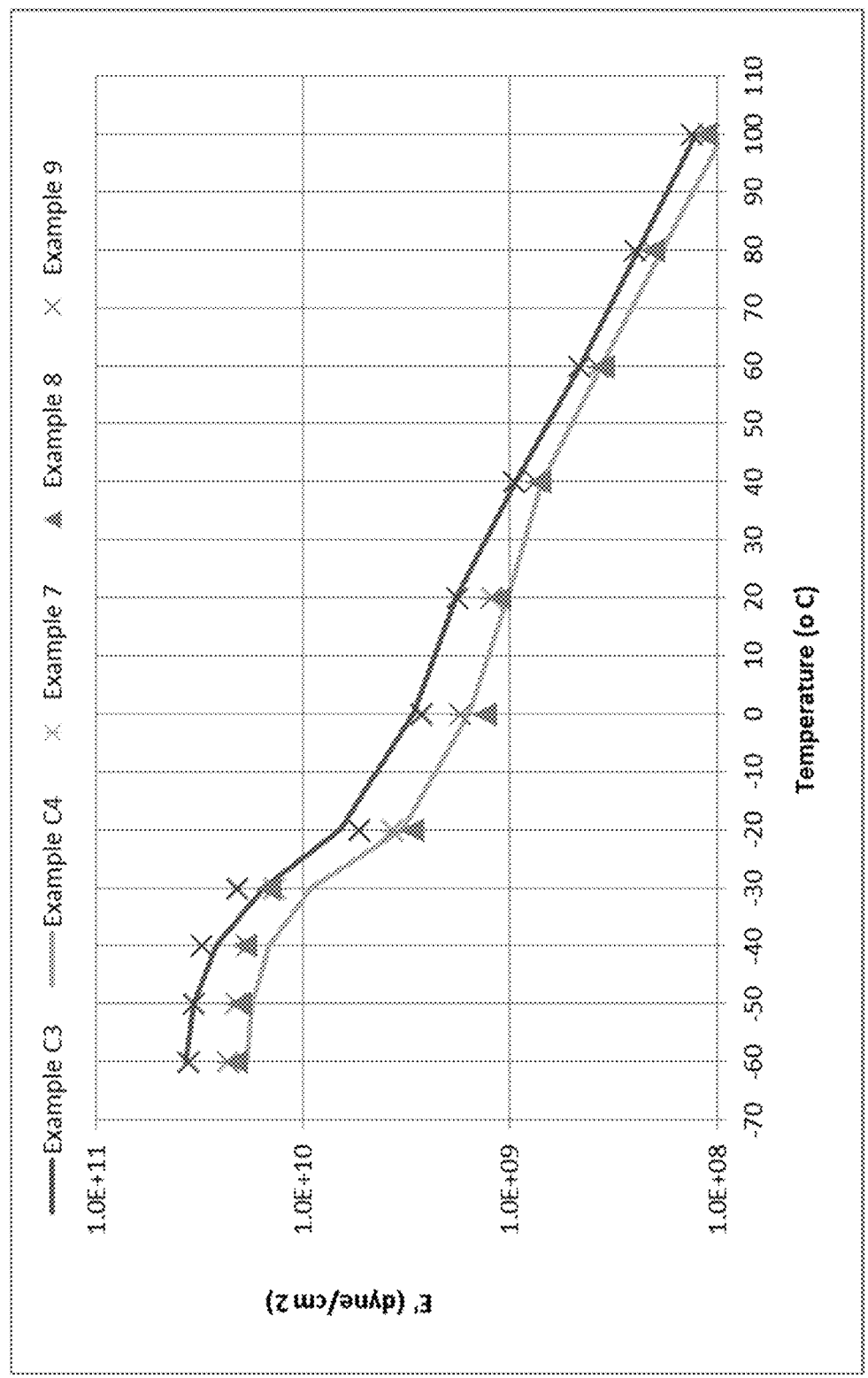
FIG. 4 illustrates the storage modulus (E') of Samples 7, 8, and 9.
Figure 5:
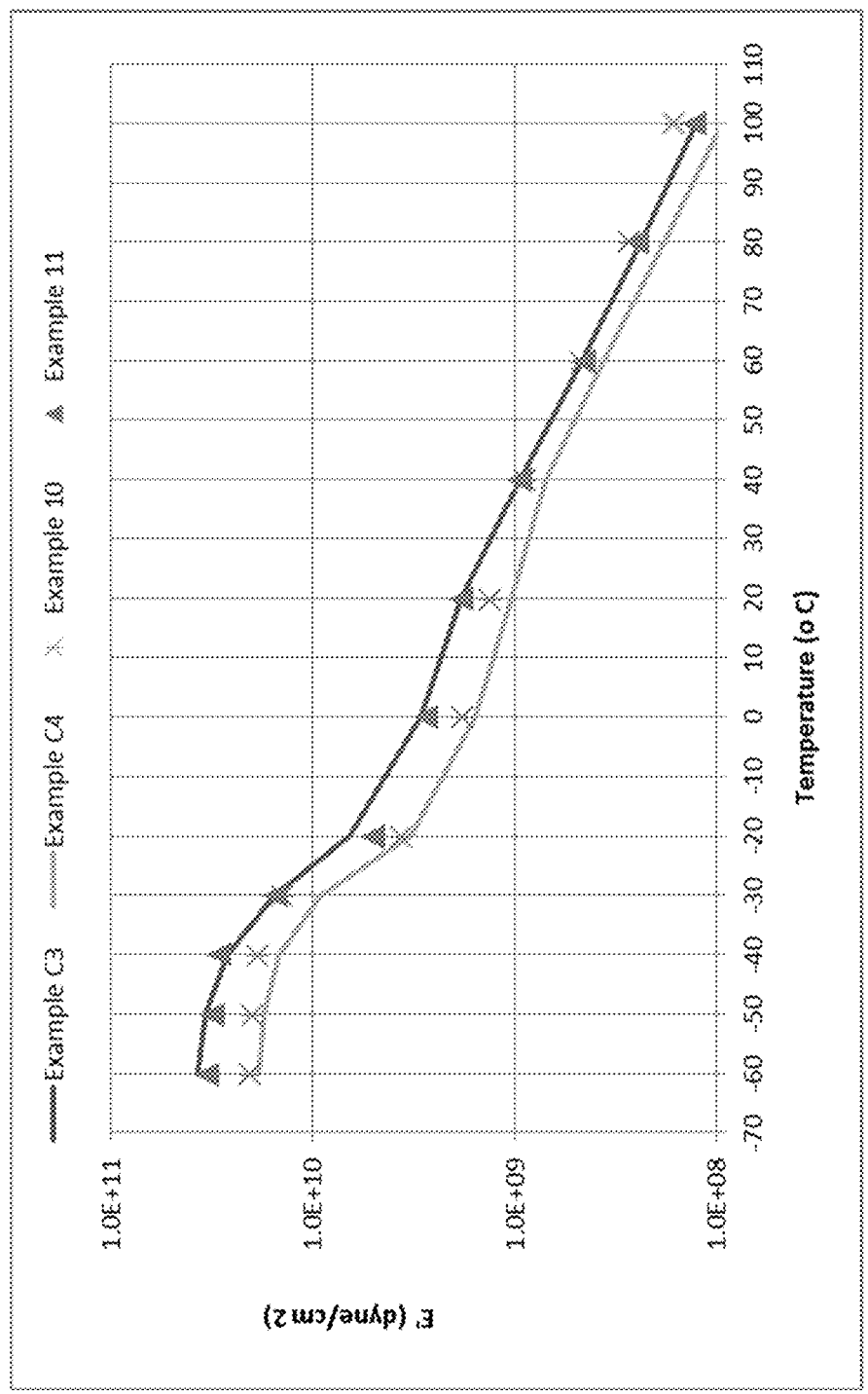
FIG. 5 illustrates the storage modulus (E') of the Samples 10 and 11.

FIGS. 4 and 5 illustrate the change in elastic modulus with temperature for the formulations of Example 3. The DMTA test was performed on the sheets by choosing samples in the flow direction (MD). As seen in FIGS. 4 and 5, Samples 7 through 11 exhibited increased modulus than Example C4 at 100° C. Samples 7, 8, and 10 closely followed the modulus curve of Sample C4 at temperatures from −40° C. to 40° C. However, at temperatures from 60° C. to 100° C., the modulus curves approached that of Sample C3.

Certain embodiments and features have been described using a set of numerical upper limits and a set of numerical lower limits. It should be appreciated that ranges from any lower limit to any upper limit are contemplated unless otherwise indicated. All numerical values are "about" or "approximately" the indicated value, and take into account experimental error and variations that would be expected by a person having ordinary skill in the art.

As used herein, the phrases "substantially no," and "substantially free of" are intended to mean that the subject item is not intentionally used or added in any amount, but may be present in very small amounts existing as impurities resulting from environmental or process conditions.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:

1. A roofing membrane comprising a blend composition of:
   (a) from about 10 wt % to about 50 wt %, based upon the weight of the blend composition, of a propylene-based elastomer, where the propylene-based elastomer has an ethylene content of from 5 to 30 wt %, based upon the weight of the propylene-based elastomer, wherein the propylene-based elastomer is a reactor blend of a first polymer component and a second polymer component, wherein the first polymer component has an α-olefin content $R_1$ of from greater than 5 to less than 30 wt % α-olefin, based upon the total weight of the first polymer component, and wherein the second polymer component has an α-olefin content R2 of from greater than 1 to less than 10 wt % α-olefin, based upon the total weight of the second polymer component;
   (b) from about 5 wt % to about 40 wt %, based upon the weight of the blend composition, of a thermoplastic resin;
   (c) at least one flame retardant; and
   (d) at least one ultraviolet stabilizer.

2. The roofing membrane of claim 1, wherein the blend composition further comprises from about 1 wt % to about 10 wt % of a polyalphaolefin having a kinematic viscosity (KV) at 100° C. of from 3 to 3000 cSt.

3. The roofing membrane of claim 1, wherein the propylene-based elastomer has an ethylene content of from 16 to 18 wt %, based on the weight of the propylene-based elastomer.

4. The roofing membrane of claim 1, wherein the propylene-based elastomer has a melting temperature of less than 120° C. and a heat of fusion of less than 75 J/g.

5. A roofing membrane comprising a blend composition of:
   (a) from about 10 wt % to about 50 wt % of a propylene-based elastomer, where the propylene-based polymer elastomer has an ethylene content of from 16 to 18 wt %, a melting temperature of less than 120° C., and a heat of fusion of less than 75 J/g;
   (b) from about 1 wt % to about 10 wt % of a polyalphaolefin having a kinematic viscosity (KV) at 100° C. of from 3 to 3000 cSt;
   (c) from about 5 wt % to about 40 wt % of a thermoplastic resin;
   (d) at least one flame retardant; and
   (e) at least one ultraviolet stabilizer.

6. The roofing membrane of claim 5, wherein the propylene-based elastomer is a reactor blend of a first polymer component and a second polymer component, wherein the first polymer component has an α-olefin content $R_1$ of from greater than 5 to less than 30 wt % α-olefin, where the percentage by weight is based upon the total weight of the first polymer component, and wherein the second polymer component has an α-olefin content R2 of from greater than 1 to less than 10 wt % α-olefin, where the percentage by weight is based upon the total weight of the second polymer component.

7. The roofing membrane of claim 1, wherein the first polymer component has an α-olefin content $R_1$ of from 10 to 25 wt % α-olefin.

8. The roofing membrane of claim 1, wherein the second polymer component has an α-olefin content R2 of from greater than 2 to less than 8 wt % α-olefin.

9. The roofing membrane of claim 1, wherein the propylene-based elastomer comprises from 1 to 25 wt % of the second polymer component and from 75 to 99 wt % of the first polymer component, based on the weight of the propylene-based elastomer.

10. The roofing membrane of claim 2, wherein the polyalphaolefin comprises oligomers of α-olefins having from 5 to 24 carbon atoms.

11. The roofing membrane of claim 2, wherein the polyalphaolefin comprises oligomers of 1-octene, 1-decene, 1-dodecene, and blends thereof.

12. The roofing membrane of claim 2, wherein the polyalphaolefin has a weight average molecular weight (Mw) of less than 5,000 g/mole.

13. The roofing membrane of claim 2, wherein the polyalphaolefin has a kinematic viscosity (KV) at 100° C. of from 5 to 100 cSt.

14. The roofing membrane of claim 1, wherein the thermoplastic resin comprises polypropylene or an impact propylene copolymer.

15. The roofing membrane of claim 1, wherein the thermoplastic resin comprises a polypropylene that has an MFR (230° C.; 2.16 kg) of greater than 15 g/10 min.

16. The roofing membrane of claim 1, wherein the thermoplastic resin comprises an impact propylene copolymer that has a MFR (230° C.; 2.16 kg) of less than 30 g/10 min.

17. The roofing membrane of claim 1, wherein the blend composition has an MFR (230° C.; 2.16 kg) of less than 5 g/10 min.

18. The roofing membrane of claim 1, wherein the blend composition has at least three of the following properties:
  (i) a storage modulus (E') at −40° C. of less than $2.5 \times 10^{10}$ dynes/cm$^2$;
  (ii) a storage modulus (E') at −30° C. of less than $1.5 \times 10^{10}$ dynes/cm$^2$;
  (iii) a storage modulus (E') at −20° C. of less than $5 \times 10^9$ dynes/cm$^2$;
  (iv) a storage modulus (E') at 0° C. of less than $2 \times 10^9$ dynes/cm$^2$;
  (v) a storage modulus (E') at 20° C. of less than $1.5 \times 10^9$ dynes/cm$^2$;
  (vi) a storage modulus (E') at 40° C. of greater than $6.5 \times 10^8$ dynes/cm$^2$;
  (vii) a storage modulus (E') at 60° C. of greater than $4 \times 10^8$ dynes/cm$^2$;
  (viii) a storage modulus (E') at 80° C. of greater than $2 \times 10^8$ dynes/cm$^2$; or
  (ix) a storage modulus (E') at 100° C. of greater than $1 \times 10^8$ dynes/cm$^2$.

19. The roofing membrane of claim 1, where the blend composition comprises from about 30 to 50 wt % of the propylene-based elastomer, from 10-20 wt % of the thermoplastic resin, and from about 1 to about 5 wt % of the polyalphaolefin, based on the weight of the composition.

20. The roofing membrane of claim 1, where the blend composition comprises from about 10 to about 30 wt % of the flame retardant, based on the weight of the blend composition.

21. The roofing membrane of claim 1, where the blend composition comprises from about 1 to about 5 wt % of the ultraviolet stabilizer, based on the weight of the blend composition.

22. The roofing membrane of claim 1, wherein the blend composition further comprises an ethylene-based polymer.

23. The roofing membrane of claim 22, wherein the ethylene-based polymer is an ethylene-based plastomer having a glass transition temperature (Tg) of from −40 to −50° C.

24. A roofing composition comprising the roofing membrane of claim 1.

* * * * *